United States Patent
Gupta

(10) Patent No.: US 7,236,923 B1
(45) Date of Patent: Jun. 26, 2007

(54) ACRONYM EXTRACTION SYSTEM AND METHOD OF IDENTIFYING ACRONYMS AND EXTRACTING CORRESPONDING EXPANSIONS FROM TEXT

(75) Inventor: Kalyan M Gupta, Alexandria, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 947 days.

(21) Appl. No.: 10/212,914

(22) Filed: Aug. 7, 2002

(51) Int. Cl.
G06F 17/30 (2006.01)
G06F 17/27 (2006.01)
G06F 17/28 (2006.01)

(52) U.S. Cl. .................... 704/9; 704/7; 704/8
(58) Field of Classification Search .............. 704/2, 704/6, 9, 8, 7
See application file for complete search history.

(56) References Cited

U.S. PATENT DOCUMENTS

| | | | |
|---|---|---|---|
| 5,161,105 A | 11/1992 | Kugimiya et al. | |
| 5,287,278 A | 2/1994 | Rau | |
| 5,404,507 A | 4/1995 | Bohm et al. | |
| 5,634,084 A | 5/1997 | Malsheen et al. | |
| 5,761,640 A | 6/1998 | Kalyanswamy et al. | |
| 5,819,260 A | 10/1998 | Lu et al. | |
| 5,913,193 A | 6/1999 | Huang et al. | |
| 5,949,961 A | 9/1999 | Sharman | |
| 6,115,686 A | 9/2000 | Chung et al. | |
| 6,182,027 B1 | 1/2001 | Nasukawa et al. | |
| 6,279,018 B1 | 8/2001 | Kudrolli et al. | |
| 6,385,629 B1 | 5/2002 | Sundaresan et al. | |
| 6,539,376 B1* | 3/2003 | Sundaresan et al. | 707/5 |
| 6,966,030 B2* | 11/2005 | Ashford et al. | 715/532 |
| 2001/0029455 A1 | 10/2001 | Chin et al. | |
| 2002/0046248 A1 | 4/2002 | Dexler | |
| 2002/0065653 A1 | 5/2002 | Kriechbaum et al. | |
| 2002/0069059 A1 | 6/2002 | Smith | |
| 2003/0139921 A1* | 7/2003 | Byrd et al. | 704/10 |
| 2003/0225571 A1* | 12/2003 | Levin et al. | 704/201 |
| 2004/0148156 A1* | 7/2004 | Hawkins | 704/10 |

OTHER PUBLICATIONS

Larkley et al., Acrophile: an automated acronym extractor and server, 2000, International Conference on Digital Libraries, Proceedings of the fifth ACM conference on Digital libraries, ACM Press, pp. 205-214.*

(Continued)

Primary Examiner—Tālivaldis Ivars Šmits
Assistant Examiner—Abdelali Serrou
(74) Attorney, Agent, or Firm—Edell, Shapiro & Finnan, LLC

(57) ABSTRACT

An acronym expansion system of the present invention receives electronic documents and extracts acronyms and their corresponding expansions. A part-of-speech tagger decomposes text into string tokens or words and tags them with their part-of-speech, while an acronym identifier determines whether a word is a potential acronym based on various conditions. An expansion identifier retrieves lists of words preceding and following a potential acronym to search for the expansion. The resulting word lists are examined sequentially to identify and retrieve an expansion for the potential acronym. An expansion extractor receives the potential acronym and a processed word list to retrieve the expansion of the potential acronym from that list. The extractor may utilize information from prior search iterations, and verifies an extracted expansion against a set of rules to remove spurious expansions.

86 Claims, 10 Drawing Sheets

OTHER PUBLICATIONS

Brill, E., "A Corpus-Based Approach to Language Learning", Doctoral dissertation: University of Pennsylvania, 1993.

Larkey, L.S., Ogilvie, P., Price, M.A. & Tamilio B., "Acrophile: An Automated Acronym Extractor and Server", *Proceedings of the ACM Digital Libraries Conference*, pp. 205-214, 2000.

Taghva, K., & Gilbreth, J., "Recognizing acronyms and their definitions", *Proceedings of the Fourth International Conference on Document Analysis and Recognition*, pp. 191-198, IEEE Computer Society. 1999.

Yeates, S., "Automatic Extraction of Acronyms from Text", *Proceedings of the Third New Zealand Computer Science Research Student's Conference*, pp. 117-124, 1999.

Yeates, S., Bainbridge, D., & Witten, I.H., "Using compression to identify acronyms in text", *Proceedings of the IEEE Data Compression Conference*, pp. 582, IEEE Computer Society, 2000.

Yi, J., & Sundaresan, N., "Mining the Web for Acronyms Using the Duality of Patterns and Relations", *Proceedings of the ACM CIKM'99 Second Workshop on Web Information and Data Management*, pp. 48-52, 1999.

Cason, Lee, "AcroWizard", *Softlookup Downloads*. www.softlookup.com/30 Day Trial Software, May 7, 2000.

Dunn, Carol, "Anvil Logic Finds Technical Solution to the Growing Acronym Problem", www.anvillogic.com/fosel.asp., Alexandria, VA.

* cited by examiner

ACRONYM EXTRACTION SYSTEM AND METHOD OF IDENTIFYING ACRONYMS AND EXTRACTING CORRESPONDING EXPANSIONS FROM TEXT

BACKGROUND OF THE INVENTION

1. Technical Field

The present invention pertains to text analysis and processing systems. In particular, the present invention pertains to a system that identifies acronyms and extracts the appropriate acronym expansion from text.

2. Discussion of Related Art

An acronym is a word that is formed from the initial letter or letters of each component of a compound term (e.g., NATO, RADAR, SNAFU, etc.), while an abbreviation is a shortened form of a written word or phrase that is used or substituted for the whole word (e.g., "amt" is an abbreviation for amount). Acronyms and abbreviations tend to overlap and are frequently used in daily verbal discourse, in written documents and in electronic documents and web pages on the Internet. In certain communities (e.g., military, engineering, medicine, etc.), numerous acronyms are employed constantly. For example, a page of a military document commonly includes in excess of ten acronyms.

Acronyms may present challenges to readers in several manners. In particular, individuals unfamiliar with a certain acronym tend to have difficulty understanding the acronym and using the acronym in vocabulary. For example, commonly known acronyms, such as "LASER" and "CDROM", are widely understood, while infrequently used or subject specific acronyms may be difficult for readers to understand (e.g., "AABFS" for Amphibious Assault Bulk Fuel System). Further, individuals preparing and/or compiling information for customers (e.g., librarians, technical writers, etc.) are aware of acronyms and typically provide convenient manners to search and access an acronym expansion. Systems that provide these types of services in the digital and electronic media are commonly referred to as "digital libraries" and "document databases". In order to be effective, a digital library should recognize acronyms and the corresponding expansion during a search. This process may be performed manually; however, preparing acronym lists with corresponding expansions in this fashion becomes prohibitive due to the effort required and is prone to errors.

The related art has attempted to overcome these problems by providing various systems for acronym expansion. For example, the AcronymFinder system enables access to a manually compiled list of acronyms on the Internet. This system receives manual submissions of acronyms and corresponding expansions to update the list. The compiled list (e.g., in excess of 150,000 acronyms) is available for embedding in applications.

The Acronym Finding Program (AFP) is an early acronym extraction system designed primarily for an optical character recognition (OCR) environment. This system utilizes a few simple heuristics for acronym identification and expansion. For an example of this type of system, reference is made to Taghva et al., "Recognizing Acronyms and Definitions", Proceedings of the Fourth International Conference on Document Analysis and Recognition, pp. 191–198, 1999, Los Alamitos, Calif.: IEEE Computer Society, the disclosure of which is incorporated herein by reference in its entirety.

A further system, TLA, is derived from ATP and uses five heuristics. This system produced a performance of 68% recall and 91% precision on a set of computer science technical reports. For an example of this type of system and performance, reference is made to Yeates, "Automatic Extraction of Acronyms from Test", Proceedings of the Third New Zealand Computer Science Research Student's Conference, pp. 117–124, 1999, Hamilton, New Zealand, the disclosure of which is incorporated herein by reference in its entirety.

Another acronym extraction system employs text compression algorithms. This system uses zero-order compression models as a manner to extract acronym expansions, where the model parameter settings are learned using an encoded training set. For an example of this type of system, reference is made to Yeates et al., "Using Compression to Identify Acronyms in Text", Proceedings of the IEEE Data Compression Conference, pp. 582–589, 2000, Los Alamitos, Calif.: IEEE Computer Society, the disclosure of which is incorporated herein by reference in its entirety.

Yet another acronym extraction system exploits duality of patterns and relations. The system is seeded with extraction patterns for acronym expansion relations. After an initial set of extractions has been obtained, the extracted instances are utilized to learn new patterns and the process repeats until convergence. For examples of this type of system, reference is made to U.S. Pat. No. 6,385,629 (Sundaresan et al.) and to Yi et al., "Mining the Web for Acronyms Using the Duality of Patterns and Relations", Proceedings of the ACM CIKM '99 Second Workshop on Web Information and Data Management", pp. 48–52, Kansas City, Mo., the disclosures of which are incorporated herein by reference in their entireties.

Still another system for acronym expansion is a heuristic extractor and server commonly referred to as "Acrophile". This system includes three versions of varying capability that use acronym identification and expansion extraction rules. For an example of this type of system, reference is made to Larkey et al, "Acrophile: An Automated Acronym Extractor and Server", Proceedings of the ACM Digital Libraries Conference, pp. 205–214, 2000, the disclosure of which is incorporated herein by reference in its entirety.

The related art systems described above suffer from several disadvantages. In particular, the AcronymFinder system is highly inefficient due to the list being generated by manual submissions. Further, the list is typically generic and static and may not suit or be tailored to various needs of particular organizations. Although the above-described systems extract acronyms and corresponding expansions, the results produced by these systems have limited accuracy. This tends to frustrate readers since the systems may omit acronyms within text or provide incorrect expansions for the acronyms, thereby requiring the reader to perform an additional task of ascertaining the correct expansion in another manner (e.g., manually). Thus, there exists a need in the art for a system that processes electronic text and documents and produces acronyms and corresponding expansions with a high degree of accuracy.

OBJECTS AND SUMMARY OF THE INVENTION

Accordingly, it is an object of the present invention to identify acronyms within text and determine corresponding expansions with a high degree of accuracy.

It is another object of the present invention to employ a bi-directional candidate search technique to select terms near an acronym in order to enhance identification of acronym expansions.

Yet another object of the present invention is to combine search iterations for acronym expansion with prior iterations in response to a search iteration failure to enhance identification of acronym expansions within text.

Still another object of the present invention is to apply rules to identified acronym expansions to verify the validity of those expansions and enhance accuracy.

The aforesaid objects may be achieved individually and/or in combination, and it is not intended that the present invention be construed as requiring two or more of the objects to be combined unless expressly required by the claims attached hereto.

According to the present invention, a computer system receives electronic ASCII or plain text documents and extracts acronyms and their corresponding expansions. In particular, the system includes a part-of-speech tagger, an acronym candidate identifier, an expansion candidate identifier, a word splitter and an expansion extractor. The part-of-speech tagger decomposes text into string tokens or words and tags them with their part-of-speech (e.g., noun, verb, adjective, etc.). Each tagged word or token is passed to the acronym candidate identifier that determines whether the word is a potential acronym based on various conditions (e.g., whether the word is a noun, the size of the word, amount of capitalization, etc.). If a word is identified as a potential acronym, the expansion candidate identifier retrieves respective lists of words preceding and following the potential acronym within the text to search for the expansion corresponding to the potential acronym.

The resulting word lists are processed sequentially (e.g., one at a time) as described below to identify and retrieve an expansion for a potential acronym. When a valid expansion is identified within a list, processing of the current potential acronym ceases (e.g., remaining lists are not searched) and the next potential acronym within the text is identified and processed. In particular, a resulting word list is passed to the word splitter that splits words residing in the word list to produce a search word list (e.g., including the word list and split words). For example, the word "Hypertext" may be decomposed into the terms "Hyper" and "text". The potential acronym and search word list are passed to the expansion extractor to retrieve the expansion of the potential acronym from the search word list. The expansion extractor includes an expansion preprocessor, an expansion searcher and an expansion filter. The expansion preprocessor initially prepares potential acronyms for searching by expanding potential acronyms including numerals (e.g., "W3C" is expanded to "WWWC").

The preprocessor further generates search candidates (e.g., subsets of the search word list) from the search word list in order to search for the acronym expansion. The search candidates are processed sequentially to identify and retrieve an acronym expansion. In particular, the expansion searcher looks for characters in the potential acronym to match with the beginning or middle characters in the words within a search window, typically including a portion of a current search candidate. Basically, the expansion searcher sequentially examines the potential acronym characters and locates corresponding words in the search window. When a search within the current search window for a potential acronym character or segment is successful, the current segment, corresponding word and search window are saved and the search window is updated for searching further acronym characters. If a search within the search window for a potential acronym character or segment fails (e.g., no corresponding word resides within the search window), the expansion searcher performs backtracking. Specifically, the system maintains a stack of potential acronym segments and search windows. When a search fails, the expansion searcher appends the current acronym segment with prior acronym segments and modifies the search window with prior search window portions to perform a search. For example, the acronym "TACON" and initial search window "Tactical Control" enable identification of "Tactical" for "T". When searching for acronym segment "A" in a modified search window of "Control", the search fails. The system backtracks by appending segment "A" to prior segment "T" (e.g., "TA") and searching the modified search window of "Tactical Control" to identify "Tactical" for "TA".

When an expansion is identified within a search candidate, the expansion is extracted (e.g., produced from the identified words corresponding to the acronym segments) and is verified against a set of rules by the expansion filter to remove spurious expansions. A valid expansion and corresponding acronym are produced, and the next acronym is retrieved for processing as described above. The above process is repeated for each tagged word to identify acronyms within the text and retrieve corresponding expansions.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
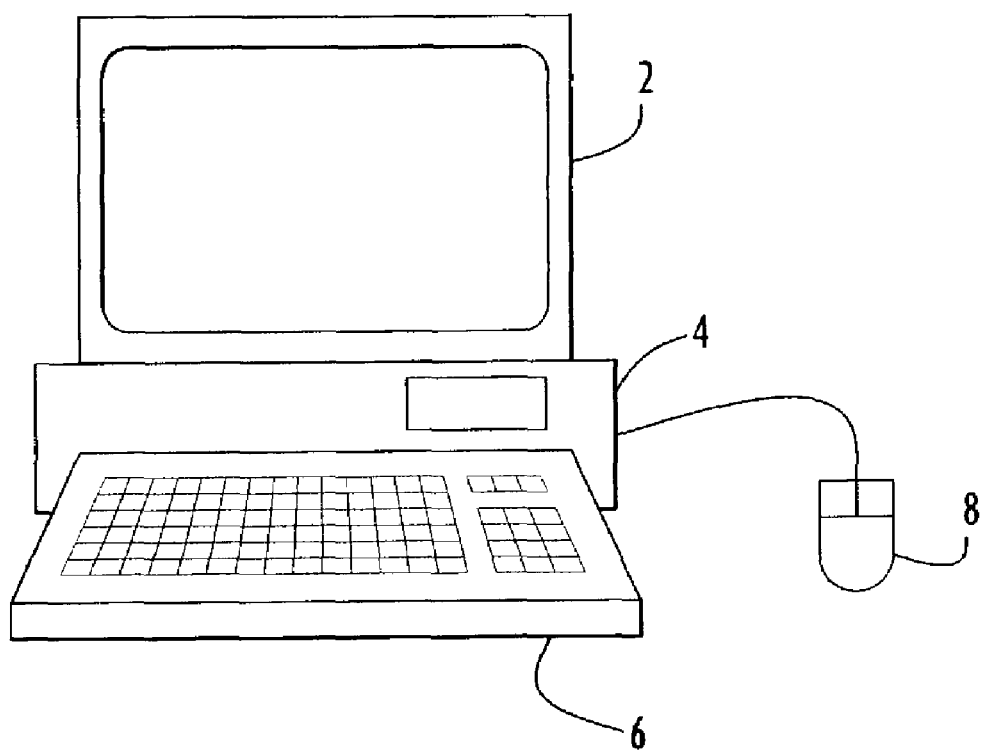
FIG. 1 is a perspective view of an exemplary computer system employed by the present invention.

The acronym expansion system or tool of the present invention basically receives ASCII or plain text documents and extracts acronyms (e.g., including phrasal abbreviations, such as "SYSAD" for System Administration) and corresponding expansions. The acronym expansion tool may process text contained in documents of other formats (e.g., .pdf, HTML, etc.); however, these documents are typically converted to plain text format for processing. The acronym expansion tool is preferably implemented by a computer system as illustrated, by way of example only, in FIG. 1. Specifically, the computer system is typically implemented by a conventional personal or other suitable computer system or workstation preferably equipped with a display or monitor 2, a base 4 (e.g., including the processor, memories and/or internal or external communications devices (e.g., modem, network cards, etc.)), a keyboard 6 and optional mouse 8 or other input device. The computer system includes software (e.g., operating system, acronym tool software, etc.) and appropriate components (e.g., processor, disk storage or hard drive, etc.) including sufficient processing and storage capabilities to effectively execute that software. The acronym software is preferably implemented in the Java computing language, while the computer system may include any platform that supports Java (e.g., Unix, Windows, Macintosh, etc.). However, the acronym tool software may be implemented in any desired computing language with the computer system utilizing any of the major platforms (e.g., Linux, Macintosh, Unix, OS2, Windows, etc.). By way of example, the computer system may be implemented by a personal computer (PC) with a one gigahertz processor and employing a Windows 2000 platform. The computer system, under software control, basically implements the acronym expansion tool of the present invention for identifying and extracting acronyms and corresponding expansions from text. The computer system preferably operates as a stand-alone tool. However, the present invention may be in the form of an embeddable system (e.g., within another system, as an embeddable software component within other software, etc.) or the computer system may function as a server in communication with client or user systems to process client requests. The acronym tool software may be available on a recorded medium (e.g., magnetic, optical, floppy, DVD, CD, etc.) or in the form of a carrier wave or signal for downloading from a source via a communication medium (e.g., bulletin board, network, WAN, LAN, Intranet, Internet, etc.).

Figure 2:
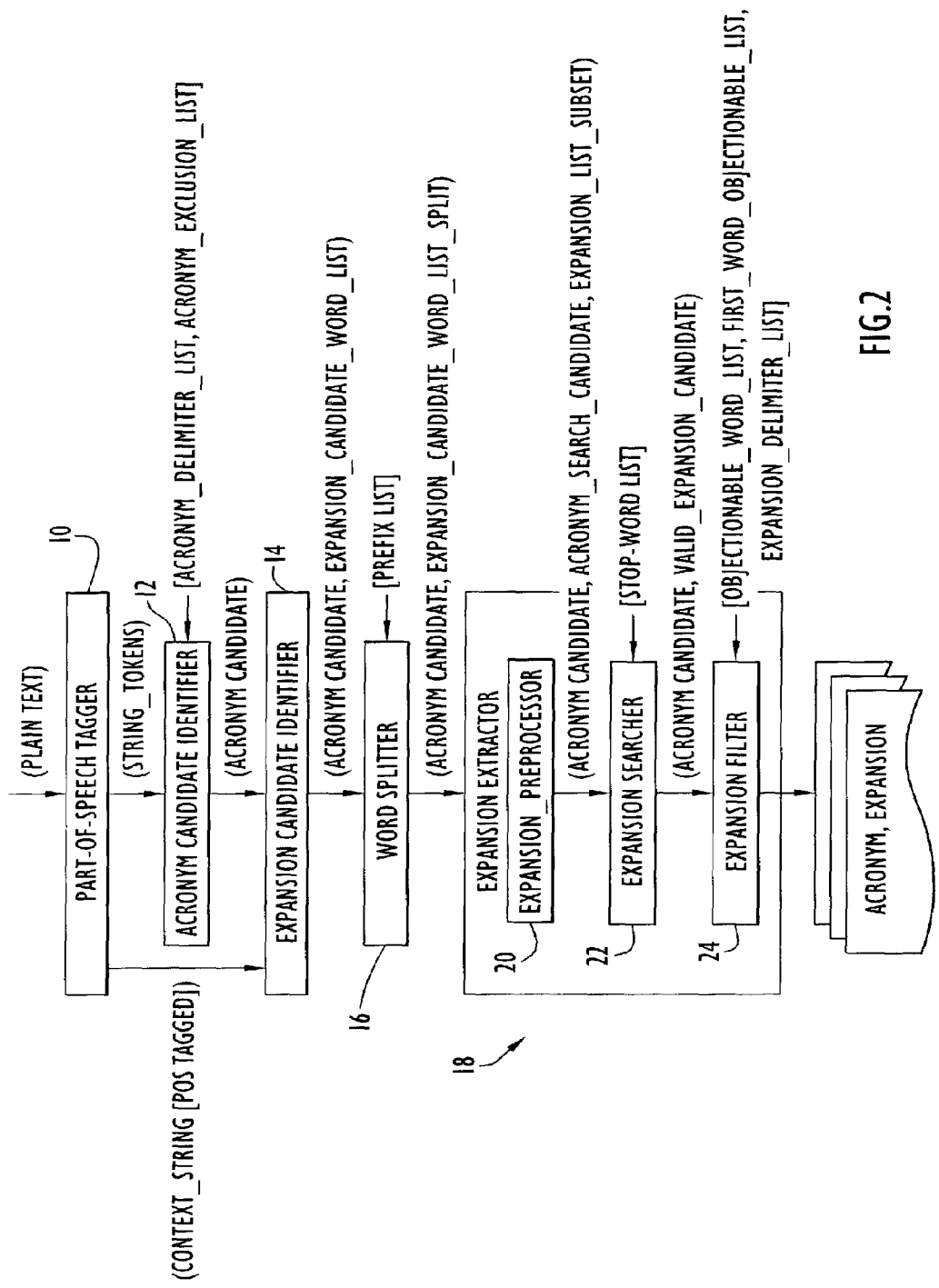
FIG. 2 is a block diagram of an acronym expansion system according to the present invention.

The acronym expansion tool of the present invention is illustrated in FIG. 2. Initially, the tool includes various software modules or units (e.g., routines, procedures, etc.) to control a computer system to perform acronym processing tasks as described above. However, the modules or units may alternatively be implemented by any individual one or combination of circuitry, software modules and/or hardware modules to perform the functions described below. Specifically, the acronym expansion tool includes a part-of-speech tagger module 10, an acronym candidate identifier module 12, an expansion candidate identifier module 14, a word splitter module 16 and an expansion extractor module 18. Part-of-speech tagger module 10 receives plain text (e.g., "PLAIN TEXT" as indicated in FIG. 2) and decomposes the entire text into string tokens or words. The part-of-speech tagger module examines each word and tags that word with a particular grammatical classification or part of speech (e.g., noun, verb, adjective, etc.). The part-of-speech tagger module preferably employs the conventional Brill Part-of-Speech tagger. For an example of this type of tagger, reference is made to Brill, "A Corpus-based Approach to Language Learning", Doctoral Dissertation: University of Pennsylvania, 1993, the disclosure of which is incorporated herein by reference in its entirety. However, any conventional or custom part-of-speech tagger for the English language may be employed.

Figure 3:
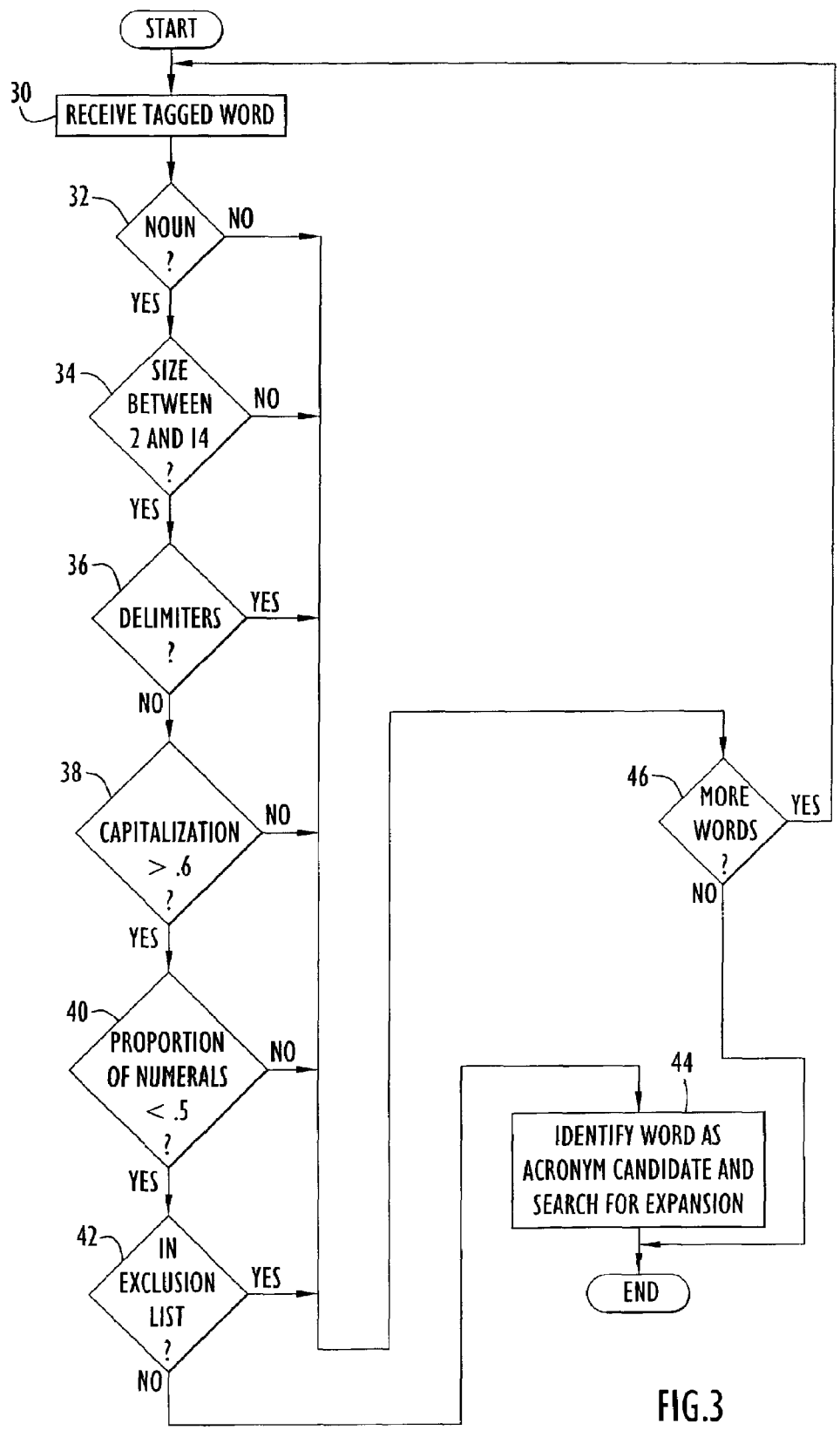
FIG. 3 is a procedural flow chart illustrating the manner in which the acronym expansion system identifies acronym candidates according to the present invention.

Acronym identifier module 12 receives the tagged words (e.g., "STRING_TOKENS" as indicated in FIG. 2) from the part-of-speech tagger module to identify potential acronyms. For example, the word "U3C" is a potential acronym, whereas the word "nation" is not a potential acronym. The acronym identifier module examines various characteristics of each word to identify potential acronyms as illustrated in FIG. 3. Initially, the acronym identifier module examines various characteristics of a word to identify a potential acronym. By way of example only, these characteristics include: the speech classification of the word; the quantity or number of characters within the word; the presence of certain delimiters within the word; the amount of capitalization within the word; the proportion of numerals within the word; and the presence of the word within a user configurable list. Specifically, the acronym identifier module receives or retrieves a tagged word at step 30, and examines the type of speech of that word based on the corresponding tag at step 32. If the word is determined to be a noun (e.g., thereby satisfying one of the conditions for identification as a potential acronym), module 12 continues to examine the word for compliance with remaining criteria. Otherwise, the module accesses the next tagged word at step 30 for processing in response to determining the presence of additional tagged words at step 46.

When the word is identified as a noun, module 12 determines whether or not the length of the word (e.g., number of characters) is between two and fourteen (e.g., $2 \leq length \leq 14$) at step 34. If the length is within this range (e.g., thereby satisfying another condition for identification as a potential acronym), module 12 continues to examine the word for compliance with remaining criteria. Otherwise, the module accesses the next tagged word at step 30 for processing in response to determining the presence of additional tagged words at step 46 as described above.

When the length of the word is within the acceptable range (e.g., $2 \leq length \leq 14$), module 12 determines the presence of delimiters (e.g., "[ ]", "{ }", punctuations, etc.) within the word in accordance with a user configurable delimiter list (e.g., "ACRONYM_DELIMITER_LIST" as indicated in FIG. 2) at step 36. Basically, module 12 compares each character within the word to the delimiter list in order to identify delimiters within the word. If delimiters are absent from the word (e.g., thereby satisfying another condition for identification as a potential acronym), module 12 continues to examine the word for compliance with remaining criteria. Otherwise, the module accesses the next tagged word at step 30 for processing in response to determining the presence of additional tagged words at step 46 as described above.

When delimiters are absent from the word, module 12 determines the amount of capitalization within the word at step 38. This is typically accomplished by determining the quantity or number of capital letters within the word and dividing by the word length (e.g., Capitalization=(Number of Capital Letters)/(Word Length)). If this ratio is greater than 0.6 or, in other words, greater than sixty percent of the word is capitalized (e.g., thereby satisfying another condition for identification as a potential acronym), module 12 continues to examine the word for compliance with the remaining criteria. Otherwise, the module accesses the next tagged word at step 30 for processing in response to determining the presence of additional tagged words at step 46 as described above.

When the amount of capitalization is acceptable, module 12 determines the proportion of numerals within the word at step 40. This is typically accomplished by determining the quantity or number of numerals within the word and dividing by the word length (e.g., Numeral Proportion=(Number of Numerals)/(Word Length)). If this ratio is less than 0.5 or, in other words, less than fifty percent of the characters within the word are numerals (e.g., thereby satisfying another condition for identification as a potential acronym), module 12 continues to examine the word for compliance with remaining criteria. Otherwise, the module accesses the next tagged word at step 30 for processing in response to determining the presence of additional tagged words at step 46 as described above.

When the numeral proportion is acceptable, module 12 determines the presence of the word within a user-configurable exclusion list (e.g., "ACRONYM_EXCLUSION_LIST" as indicated in FIG. 2) at step 42. This list basically identifies particular words to be excluded from consideration as an acronym and enhances accuracy. Basically, module 12 searches the exclusion list for the word. If the word is absent from the list, the word at this point has satisfied each of the criteria for identification as a potential acronym, and module 12 identifies the word as an acronym candidate at step 44 and a search for a corresponding expansion of the identified acronym candidate commences as described below. Otherwise, the module accesses the next tagged word at step 30 for processing in response to determining the presence of additional tagged words at step 46 as described above. When each tagged word has been processed as determined at step 46, processing of the document or plain text by the acronym expansion tool terminates. The various conditions and thresholds described above may be modified in any manner to adjust the sensitivity of module 12 with respect to identifying potential acronyms.

Figure 4:
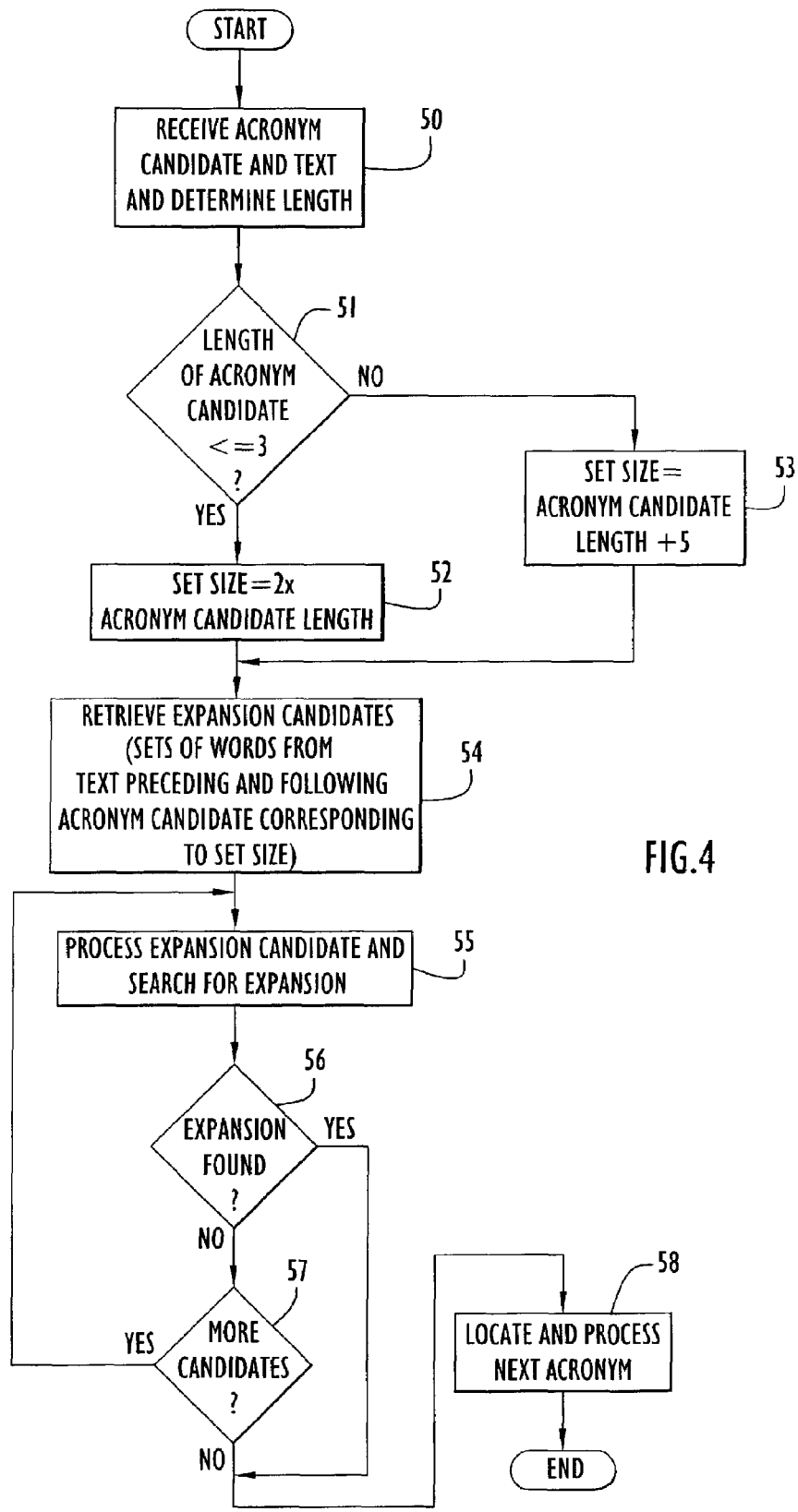
FIG. 4 is a procedural flow chart illustrating the manner in which the acronym expansion system retrieves text portions serving as candidates for expanding the identified acronym candidates according to the present invention.

When acronym identifier module 12 identifies a tagged word as an acronym candidate, expansion candidate identifier module 14 (FIG. 2) receives the acronym candidate (e.g., "ACRONYM CANDIDATE" as indicated in FIG. 2) from module 12 and selects expansion candidates or terms within the text in the neighborhood of the identified acronym as illustrated in FIG. 4. In other words, module 14 retrieves individual sets of tagged words within the text that precede (e.g., are prior to) and follow (e.g., are subsequent) the identified acronym, respectively. These sets or expansion candidates each basically include a sequence of words in which an expansion for an acronym may be searched. Specifically, module 14 receives an acronym candidate and text tagged with the appropriate speech classification (e.g., "CONTEXT_STRING" as indicated in FIG. 2), and determines the length or number of characters within the acronym candidate at step 50. The received information may further include positional information (e.g., a pointer) to indicate the location of an acronym candidate within the text. If the number of acronym characters is less than or equal to three (e.g., number of characters≦3) as determined at step 51, module 14 sets the number of words to retrieve from the tagged text to be twice the acronym candidate length (e.g., number of words to retrieve=2*acronym candidate length) at step 52. Otherwise (e.g., when the acronym candidate length is greater than three), the number of words to retrieve is set to five more than the acronym length (e.g., number of words to retrieve=acronym candidate length+5) at step 53. Module 14 subsequently retrieves from the tagged text at step 54 a set of words prior to or preceding the acronym candidate and a set of words following or subsequent the acronym candidate with each set including the number of words determined as described above (e.g., twice the acronym length for acronym candidates having a length less than or equal to three, or five more than the acronym candidate length for acronyms having lengths greater than three). The retrieval may utilize the positional information to rapidly locate the words for each set within the text. The smaller sets for shorter acronyms enable avoidance of selecting spurious expansions, while the length of sets for larger acronyms is determined from effective results indicated through simulations. However, the set lengths and corresponding conditions may be modified in any manner to adjust sensitivity of expansion candidate selection.

Once the word sets or expansion candidates are retrieved, the expansion candidates are sequentially processed to determine the presence of an expansion for the acronym candidate. In particular, an initial expansion candidate (e.g., set of words preceding the acronym) is processed and searched for an expansion at step 55 in the manner described below. Module 14 basically places the current expansion candidate in a list (e.g., "EXPANSION_CANDIDATE_WORD_LIST" as indicated in FIG. 2) for processing by word splitter module 16 described below to commence expansion searching. If an expansion is identified within that expansion candidate as determined at step 56, module 14 informs the acronym identifier module at step 58 to locate and facilitate processing of the next potential acronym within the text in the manner described above (e.g., generally returning to step 46 of FIG. 3). When the expansion is absent from the initial expansion candidate, module 14 determines the presence of additional expansion candidates at step 57. If additional expansion candidates are present, the next expansion candidate (e.g., the set of words following the acronym) is processed and searched for an expansion at step 55 in the manner described below. When an expansion is identified within that expansion candidate, the acronym identifier module is informed at step 58 to locate and facilitate processing of the next acronym candidate as described above. The process is basically repeated until each expansion candidate has been processed or until an expansion is identified. If no expansion candidates contain an expansion, processing of the current potential acronym ceases and the acronym identifier module is informed at step 58 to locate and facilitate processing of the next potential acronym as described above.

Figure 5:
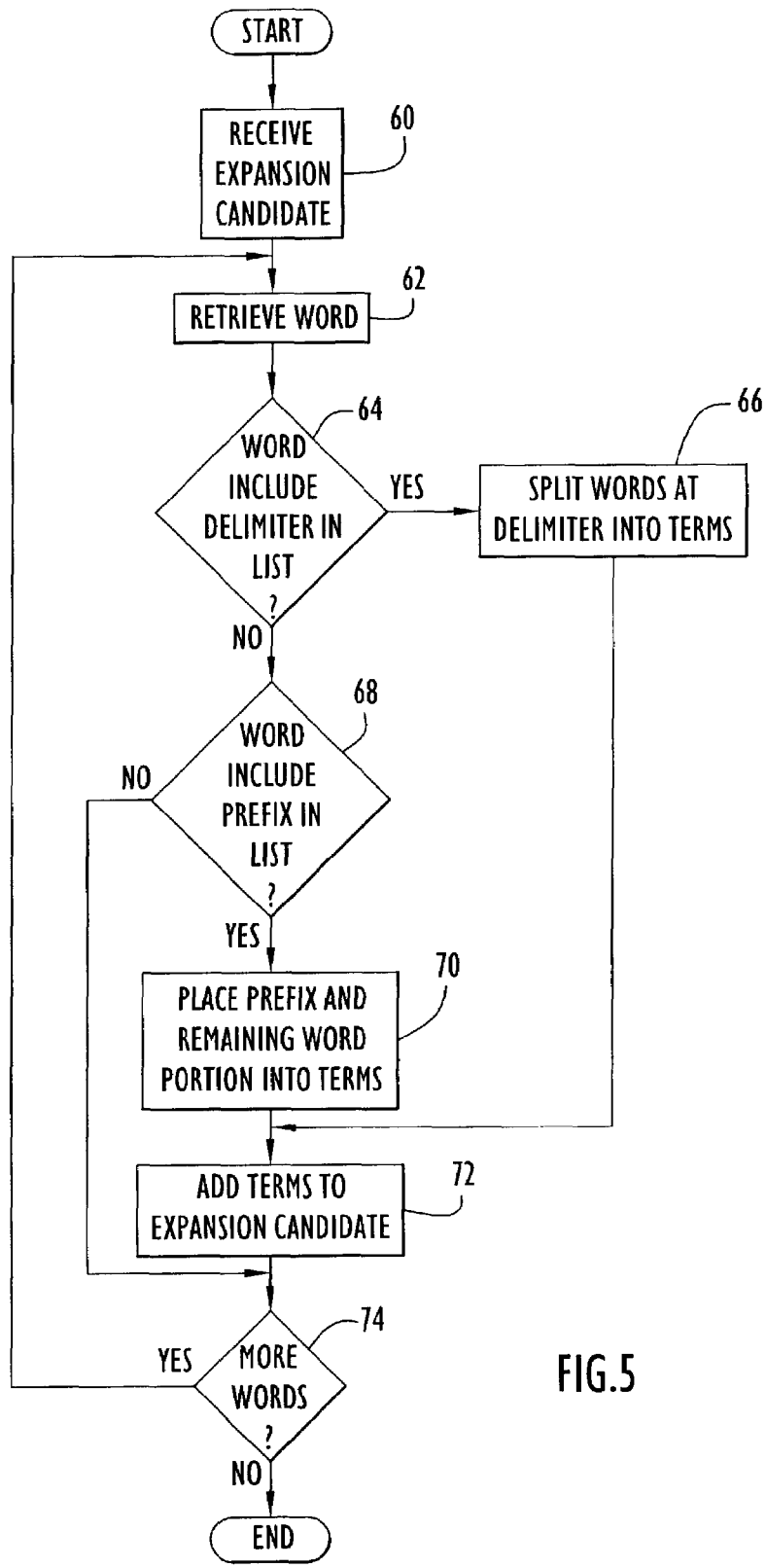
FIG. 5 is a procedural flow chart illustrating the manner in which the acronym expansion system decomposes words within an expansion candidate into individual terms to produce an expansion list according to the present invention.

Word splitter module 16 (FIG. 2) receives an expansion candidate (e.g., a word set) from the expansion candidate identifier module and utilizes a data resource to split or decompose words within the expansion candidate to facilitate expansion searching as illustrated in FIG. 5. The word splitter module basically splits words with hyphens, slashes and common prefixes, and employs a user-defined prefix list (e.g., "PREFIX LIST" as indicated in FIG. 2) to identify prefixes and decompose words into individual terms. For example, the word "Hypertext" may be decomposed into the terms "Hyper" and "Text", while the word "Unexploded" may be decomposed into the terms "Un" and "exploded".

The word splitter module searches each word in an expansion candidate for a prefix or delimiter within respective prefix and delimiter lists. If a prefix is identified, the module decomposes the word into individual terms that include the prefix and remaining word portion, respectively. When a delimiter is present, the module decomposes the word into individual terms that include the word portions preceding and following the delimiter, respectively. The terms are added to the expansion candidate. Specifically, word splitter module 16 receives an expansion candidate at step 60 and further retrieves a word from that expansion candidate at step 62. Module 16 determines the presence of a delimiter within the word at step 64. This is typically accomplished by comparing each character of the word to the delimiter list. If a delimiter is present, the word is decomposed at step 66 into individual terms containing the word portion preceding and following the delimiter, respectively. These terms are added as words to the expansion candidate at step 72 with the resulting expansion candidate stored in an expansion list (e.g., "EXPANSION_CANDI-DATE_WORD_LIST_SPLIT" as indicated in FIG. 2). The expansion list is updated in response to each word decomposition within the expansion candidate for further processing as described below.

When a delimiter is absent from the word as determined at step 64, the word splitter module determines the presence of a prefix within the word at step 68. This is typically accomplished by comparing the word to the prefix list. If the word includes a prefix, the word is decomposed into individual terms at step 70 containing the prefix and remaining word portion, respectively. These terms are added as words to the expansion candidate at step 72 as described above.

After terms have been added to the expansion candidate at step 72 or if the word does not include a prefix as determined at step 68, the word splitter module retrieves and processes subsequent or following words in the expansion candidate in the manner described above until each candidate word has been processed as determined at step 74. Thus, the resulting expansion candidate is stored in the expansion list and includes the words initially within the expansion candidate (e.g., words retrieved from the text in the neighborhood of an identified acronym) and the decomposed terms of those words.

Expansion extractor module 18 (FIG. 2) receives an acronym candidate and the resulting expansion list and determines the presence of an expansion for the acronym candidate within that list. The expansion extractor module includes an expansion preprocessor module 20, an expansion searcher module 22 and an expansion filter module 24. The preprocessor module prepares the acronym candidate and expansion list for searching, while the expansion searcher module searches for characters in the prepared acronym candidate that match the initial or intermediate portions of words contained in a search window (e.g., including a portion of the prepared expansion list). When the search is successful, an expansion is extracted and prepared for output with the corresponding acronym. The expansion filter module verifies the extracted expansion in accordance with filtering rules to remove expansions considered to be spurious.

Figure 6:
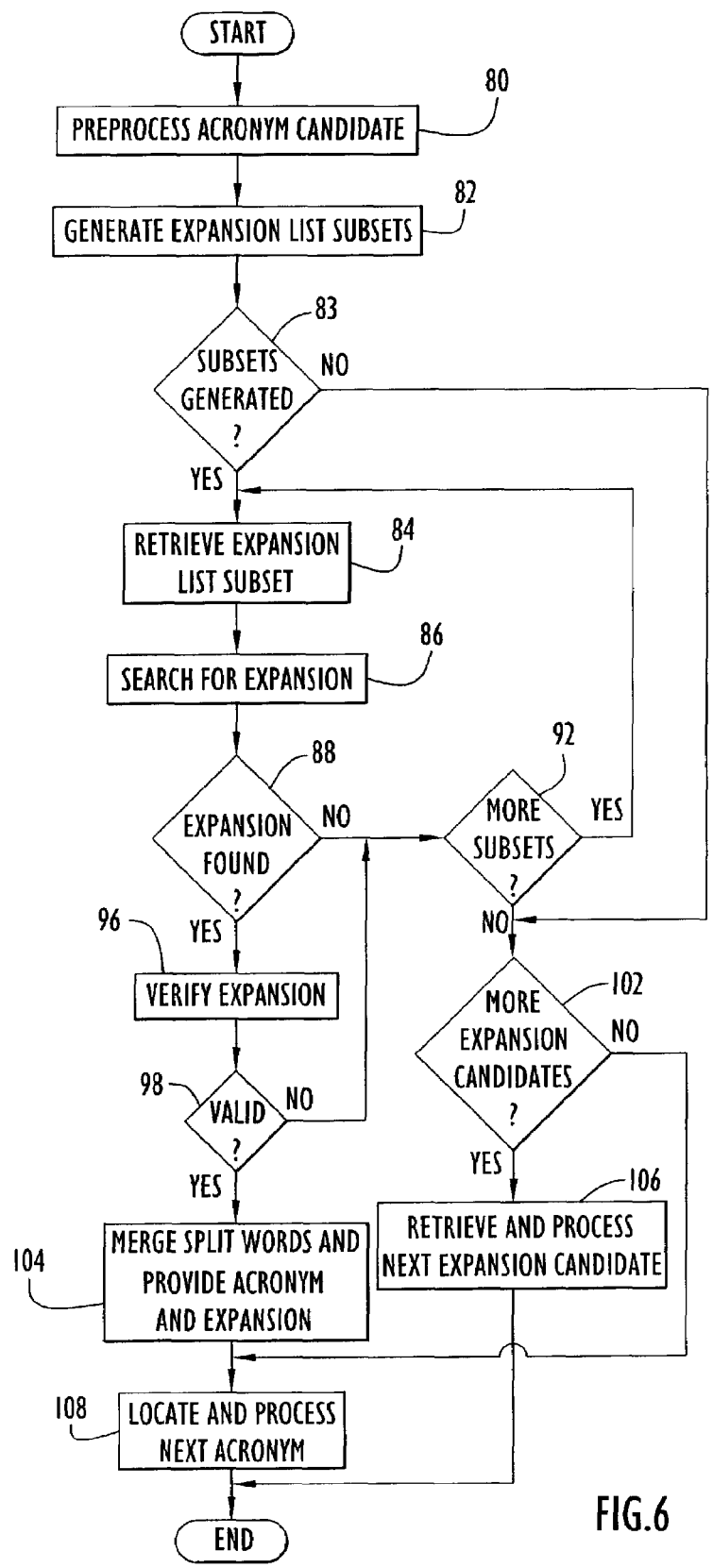
FIG. 6 is a procedural flow chart illustrating the manner in which the acronym expansion system identifies and retrieves an acronym expansion from the expansion list according to the present invention.

The manner in which the expansion extractor module determines the presence of an acronym expansion within an expansion list is illustrated in FIG. 6. Initially, expansion preprocessor module 20 (FIG. 2) preprocesses the acronym candidate at step 80. This typically includes expanding acronym candidates that contain numerals by replacing each combination of a numeral (e.g., numerals less than five) and preceding character (e.g., alphabetic) within an acronym candidate with a string including the preceding character repeated a number of instances corresponding to the numeral. For example, the candidate "W3C" is expanded to "WWWC", while the candidate "C2PC" is expanded to "CCPC". The preprocessor module may further modify an acronym candidate from plural to singular form by removing the plural suffix (e.g., the suffix "s"). By way of example, the acronym candidate "FLOPs" may be modified to "FLOP". The resulting acronym or acronym search candidate is utilized by module 18 to search for and identify an expansion as described below.

Once the acronym candidate is preprocessed, expansion preprocessor module 20 basically creates subsets of the expansion list at step 82. This is typically accomplished by locating each word within the expansion list including the same first letter as the acronym search candidate or including the first letter of the acronym search candidate within the initial thirty percent of that word. Each expansion list subset includes a corresponding located word and the words following the located word within the expansion list (e.g., words within the expansion list preceding the located word are excluded from the expansion list subset). For example, the acronym search candidate "ATO" and corresponding expansion list "The, Air, Tasking, Order, was, issued" enables identification of the words "Air" and "Tasking" since the letter "A" is the first letter of "Air" and within the initial portion of "Tasking". This example produces expansion list subsets "Air, Tasking, Order, was, issued" and "Tasking, Order, was, issued" with each subset containing a corresponding identified word and subsequent or following words within the expansion list. If no expansion subsets are generated (e.g., words are absent from the expansion list corresponding to the first acronym search candidate letter) as determined at step 83, module 18 determines the presence of additional expansion candidates at step 102. In other words, the system excludes the current expansion candidate from consideration when no words within the expansion list derived from that candidate correspond to the acronym search candidate first letter. If additional expansion candidates exist (e.g., the set of words following the acronym candidate), module 18 informs the expansion candidate identifier module at step 106 to commence processing of the next expansion candidate in the manner described above (e.g., generally returning to step 57 of FIG. 4). Otherwise, module 18 informs the acronym identifier module at step 108 to locate and facilitate processing of the next potential acronym within the text in the manner described above (e.g., generally returning to step 46 of FIG. 3).

When expansion list subsets are generated, the acronym search candidate and expansion list subsets are utilized to identify the acronym expansion. Basically, the expansion searcher module applies a bi-directional search pattern to match segments within the acronym search candidate with words in the respective expansion list subsets. The expansion searcher module searches for words in a search window (e.g., a portion of an expansion list subset) that contains the acronym segment. The expansion searcher module examines each character in the acronym search candidate (e.g., "ACRONYM_SEARCH_CANDIDATE" as indicated in FIG. 2) sequentially, locates corresponding words in the search window and updates the window to exclude the located word. When the search fails, the expansion searcher module employs backtracking, where prior acronym segments are combined with a current segment and the search window is modified to determine a match. This feature enhances extraction performance. Once matches are identified for all acronym segments, the expansion searcher module prepares the resulting expansion by combining the located words for the acronym segments.

In particular, the expansion searcher module retrieves an expansion list subset (e.g., "EXPANSION_LIST_SUBSET" as indicated in FIG. 2) at step 84 and searches for an expansion within the expansion list subset as described below at step 86. If an expansion is found as determined at step 88, the expansion is verified at step 96 as described below. When an expansion is not found, module 18 determines the presence of additional expansion list subsets at step 92. If additional expansion list subsets are present for an expansion candidate, the next subset is retrieved for processing at step 84 as described above. When each expansion list subset for an expansion candidate has been processed without identification of an expansion, module 18 determines the presence of additional expansion candidates at step 102 as described above. If additional expansion candidates exist (e.g., the set of words following the acronym candidate), module 18 informs the expansion candidate identifier module at step 106 to commence processing of the next expansion candidate as described above. Otherwise, module 18 informs the acronym identifier module at step 108 to locate and facilitate processing of the next potential acronym within the text as described above. The process is basically repeated until an expansion is identified within an expansion list subset as determined at step 88 or until each expansion candidate (and corresponding expansion list subsets) is processed as determined at steps 92 and 102 as described above.

Figure 7:
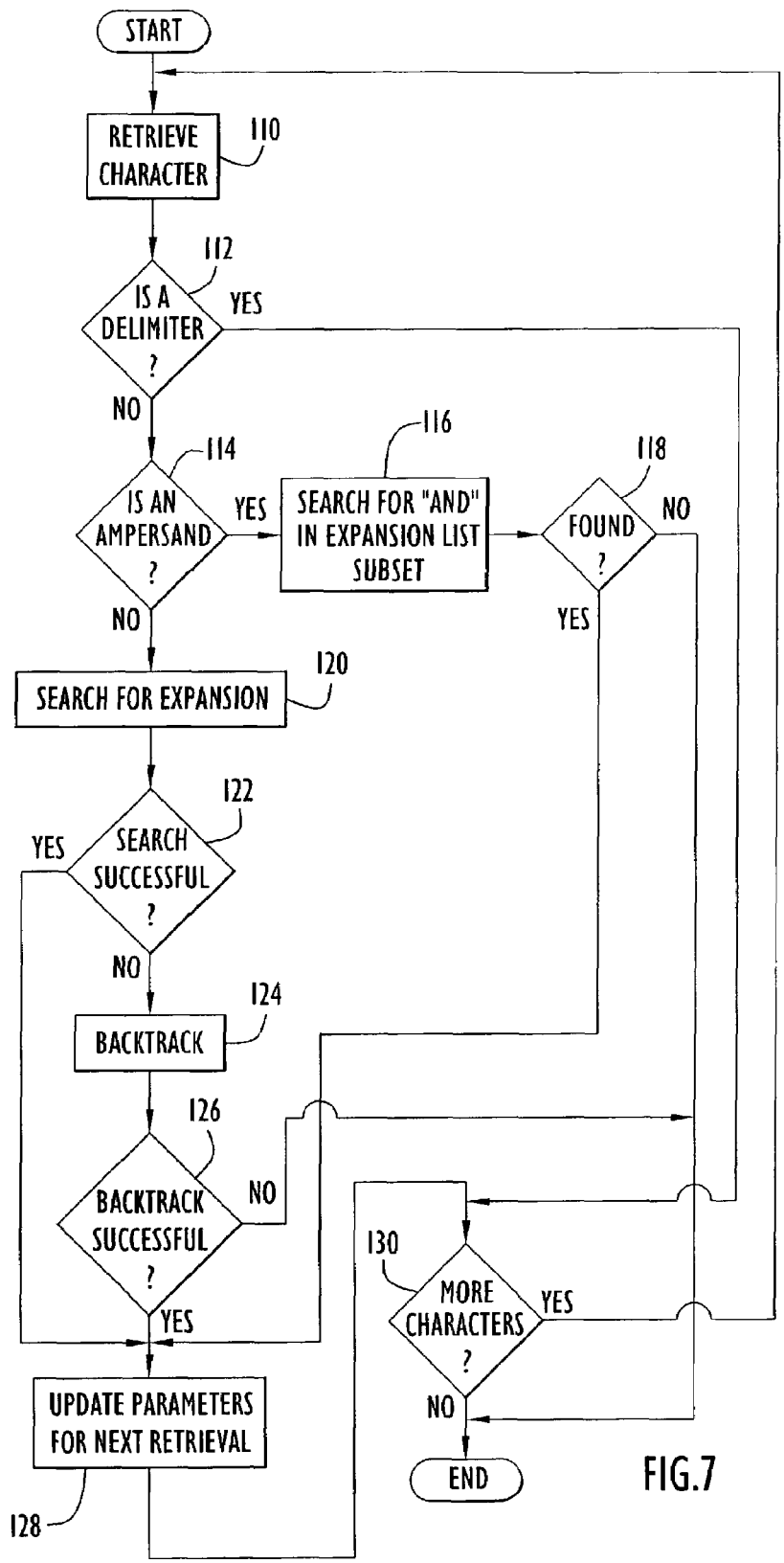
FIG. 7 is a procedural flow chart illustrating the manner in which the acronym expansion system searches for an acronym expansion within a subset of the expansion list according to the present invention.

The manner in which the expansion searcher module searches for an expansion within an expansion list subset is illustrated in FIG. 7. Initially, the expansion searcher module searches for a valid expansion corresponding to an acronym search candidate by repeatedly cycling through the acronym search candidate to generate acronym segments and locating those segments within words of a search window (e.g., including a portion of the expansion list subset). This process is repeated until each segment is located within a search window or until the expansion list subset is exhausted. A failure to locate an acronym segment within a search window invokes backtracking or utilization of prior segments and modified search windows to locate a match. Backtracking is utilized since a greedy search technique is employed. When an acronym segment is located in a search window word, the search window is modified to exclude the located word (e.g., shifted to start at the word immediately following the located word).

Specifically, the expansion searcher module retrieves a character from the acronym search candidate at step 110 to form an acronym segment. The expansion searcher module determines if the segment is a delimiter (e.g., "–", "=", "/", etc.) at step 112. This is typically accomplished by comparing the acronym segment to a delimiter list similar to the manner described above. When the segment contains a delimiter, the next character in the acronym search candidate is retrieved for processing at step 110 as described above in accordance with the presence of additional acronym search candidate characters as determined at step 130.

If the segment does not contain a delimiter, the acronym segment is examined for the presence of an ampersand (e.g., "&") at step 114. When the segment contains an ampersand, the expansion list subset is examined for the presence of the corresponding word "AND" at step 116. If the word "AND" is present as determined at step 118, various variables or parameters are updated at step 128 in order to process the next acronym search candidate character. Basically, this includes storing the current acronym segment (e.g., "&"), identified expansion word (e.g., "AND") and search window within respective data structures (e.g., stacks) and modifying the search window to remove the identified expansion word. The search window is typically modified to begin with the word in the expansion list subset that immediately follows the identified expansion word. Thus, the search window is basically moved forward within the subset to begin at the word following the identified expansion word. Once the parameters are updated, the next character in the acronym search candidate is retrieved for processing at step 110 as described above in accordance with the presence of additional acronym search candidate characters as determined at step 130. When the word "AND" is not present within the expansion list subset, the search with respect to the current expansion list subset terminates (e.g., generally returning to step 88 of FIG. 6).

Figure 8:
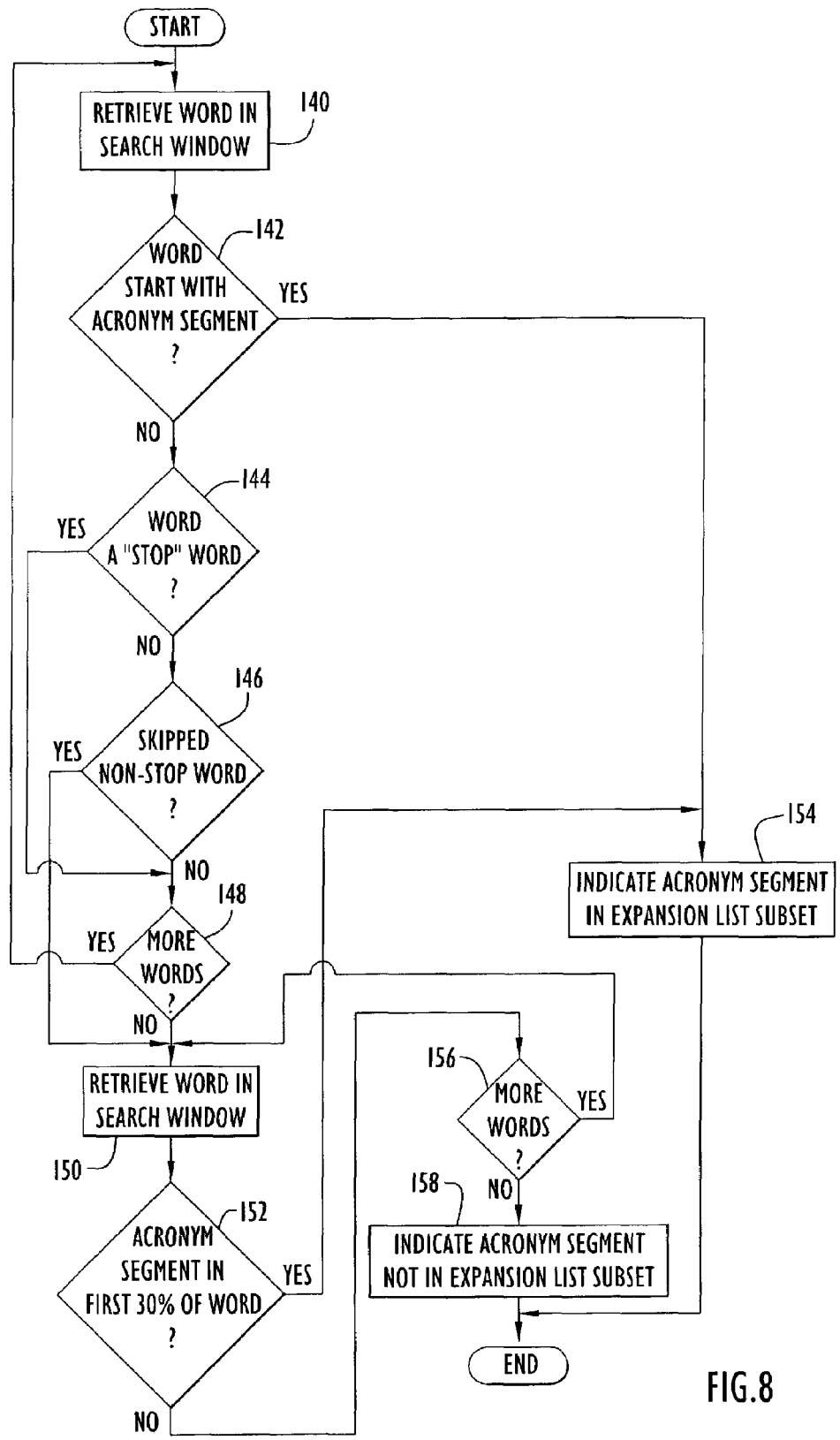
FIG. 8 is a procedural flow chart illustrating the manner in which the acronym expansion system compares an acronym candidate to words within a search window to identify an acronym expansion according to the present invention.

When the acronym segment is not an ampersand as determined at step 114, the expansion search module determines the presence of a word within a search window (e.g., including a portion of the expansion list subset) that includes the acronym segment as an initial portion or within an initial thirty percent of the word at step 120. This process is further illustrated in FIG. 8. Initially, the presence of an acronym segment within a search window of the expansion list subset is determined. The search window size is preferably three words and starts from the beginning of an expansion list subset, but may be modified by a system administrator. The search initially attempts to locate words starting with the acronym segment. If this search fails, the search is subsequently conducted to identify portions within a word that contain the acronym segment. Specifically, a word within the search window is retrieved at step 140. The search window preferably includes the initial three words of the expansion list subset. The retrieved word is examined to determine the presence of the acronym segment as the starting portion of the word at step 142 (e.g., "Department" starts with segment "D" or "De"). If the word starts with the acronym segment, expansion searcher module 22 indicates the acronym segment is within the expansion list subset at step 154 and the search with respect to the current acronym segment terminates (e.g., generally returning to step 122 of FIG. 7 described below). Otherwise, the word is compared to a list (e.g., "STOP-WORD LIST" as indicated in FIG. 2) of certain stop words (e.g., "the", "and", "to", "he", "she", etc.) at step 144. These words are basically those that are to be excluded from consideration as an expansion. When the word is a stop word or within the list, the next word is retrieved from the expansion list subset at step 140 for processing in accordance with the presence of additional words within the search window as determined at step 148.

If the word is not a stop word, the expansion searcher module determines if a prior non-stop word has been skipped at step 146. When a prior non-stop word has been skipped, the initial letter search is terminated in favor of the search for intermediate word portions described below. If a prior non-stop word has not been skipped, the next word is retrieved from the expansion list subset at step 140 for processing as described above in accordance with the presence of additional words within the search window as determined at step 148. This process is basically repeated until a word is found as determined at step 142 or until each word within the search window has been processed as determined at step 148 as described above.

When words within the search window do not contain the acronym segment as the starting portion, the words are examined to determine if the acronym segment resides within an initial thirty percent of a word. In particular, a word is retrieved from the search window at step 150. The retrieved word is examined to determine the presence of the acronym segment within an initial thirty percent of the word. This enables identification of expansions where the acronym utilizes intermediate portions of a word. For example, the acronym "UXO" for "Unexploded Ordinance" contains the acronym segment "X" within the word "exploded". The word "Unexploded" is split by the prefix "un" to the terms "un" and "exploded" during processing as described above. However, these terms are combined subsequent the search to produce an expansion as described below. If the word contains the acronym segment, expansion searcher module 22 indicates the acronym segment is within the expansion list subset at step 154 and the search with respect to the current acronym segment terminates as described above. Otherwise, the next word is retrieved from the search window at step 150 for processing as described above in accordance with the presence of additional words within the search window as determined at step 156. The process basically repeats until a word is found as determined at step 152 or until each word in the search window has been processed as determined at step 156 as described above. When each word within the search window has been processed and determined to lack the acronym segment, module 22 indicates the acronym segment is lacking within the expansion list subset at step 158 and the search with respect to the current acronym segment terminates as described above.

Referring back to FIG. 7, if the search for an acronym segment is successful as determined at step 122, various parameters are updated at step 128 in order to process the next acronym search candidate character. Basically, this includes storing the current acronym segment, identified expansion word and search window within respective data structures (e.g., stacks) and modifying the search window to remove the identified expansion word as described above. The search window is typically modified to begin with the word in the expansion list subset that immediately follows the identified expansion word. Thus, the search window is basically moved forward within the subset to begin at the word following the identified word. Once the parameters are updated, the next acronym search candidate character is retrieved for processing at step 110 as described above in accordance with the presence of additional acronym search candidate characters as determined at step 130.

Figure 9:
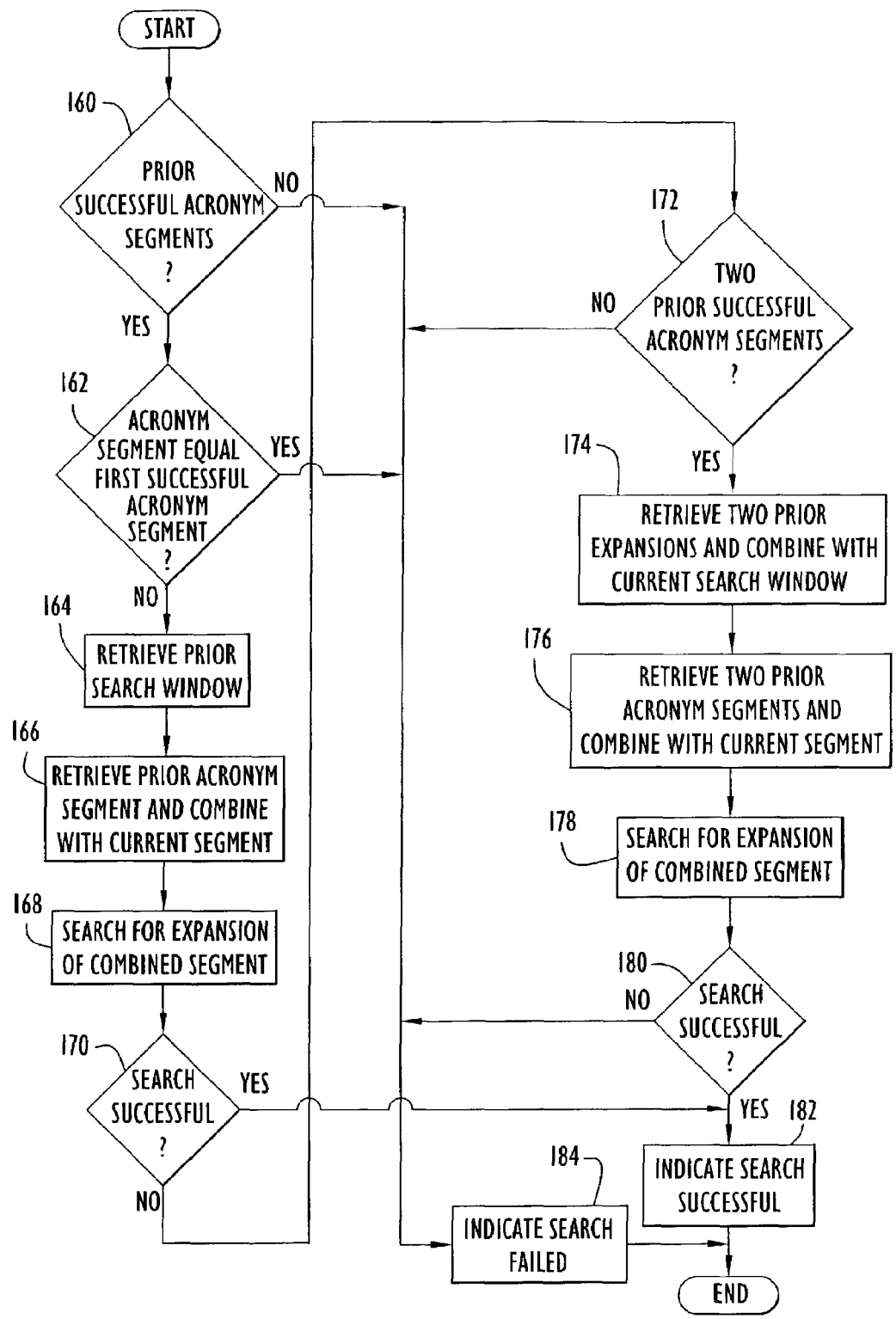
FIG. 9 is a procedural flow chart illustrating the manner in which the acronym expansion system backtracks or combines prior search iterations to identify an acronym expansion according to the present invention.

When the expansion search is unsuccessful as determined at step 122, the expansion searcher module performs backtracking at step 124 to identify an expansion for the acronym segment. This includes combining the current acronym segment and search window with prior iterations to determine a match. Backtracking basically enables identification of a single expansion term corresponding to plural acronym characters (e.g., the acronym "OPORD" for "Operation Order"). The backtracking process is further illustrated in FIG. 9. Specifically, expansion searcher module 22 determines at step 160 if any prior searches for acronym segments were successful in order to provide information to perform a backtrack. If prior information is unavailable (e.g., no acronym segments stored), an unsuccessful indication is provided at step 184 and the search with respect to the current expansion list subset terminates (e.g., generally returning to step 126 of FIG. 7 described below). Similarly, module 22 determines at step 162 if the current acronym segment is the same as the first acronym segment stored. When this is the case, an unsuccessful indication is provided at step 184 and the search terminates with respect to the current expansion list subset as described above to avoid spurious identifications. If there is sufficient information and the current acronym segment is valid, module 22 retrieves the prior search window at step 164. This is basically accomplished by moving the search window back to begin at the location within the expansion list subset utilized for the prior search. Module 22 further retrieves the prior acronym segment stored within the data structure (e.g., stack) and appends the current segment to the retrieved segment at step 166, thereby producing a combined segment. The expansion searcher module searches the prior search window for the combined segment at step 168 in the manner described above for FIG. 8. If the search is successful as determined at step 170, a successful indication is provided at step 182 and a search with respect to the next acronym segment commences (e.g., generally returning to step 126 of FIG. 7) as described below.

Otherwise (e.g., the search is unsuccessful), a subsequent level of backtracking is performed. In particular, expansion searcher module 22 determines at step 172 if at least two prior searches were successful (e.g., at least two segments are present on the data structure) in order to provide sufficient information to perform an additional backtrack. When sufficient information is unavailable, an unsuccessful indication is provided at step 184 and the search terminates with respect to the current expansion list subset as described above. If the information is available, module 22 retrieves the two prior expansions and incorporates them into the current search window at step 174 to provide a combined search window. The expansion searcher module further retrieves the two prior acronym segments and appends the current segment to those segments at step 176, thereby forming a combined segment. The expansion searcher module searches the combined search window for the combined segment at step 178 in the manner described above for FIG. 8. If the search is successful as determined at step 180, a successful indication is provided at step 182 and the search with respect to the next acronym segment commences as described below. Otherwise, an unsuccessful indication is provided at step 184 and the search with respect to the current expansion list subset terminates as described above.

An example of the backtracking process is described with respect to an acronym "OPORD" (e.g., corresponding to "Operation Order") and an expansion list subset of "Operation, Order, was, issued, to, the, unit". The initial acronym segment is "O", and a search for that segment in a search window of "Operation, Order, was" is successful in identifying "Operation" as an expansion word. The acronym and expansion word are stored and the search window is updated as described above. The next acronym character is retrieved and the acronym segment is "P" with a search window of "Order, was, issued". The search for this segment fails since no words contain an initial portion with the acronym segment. The system performs backtracking by combining the current and previous acronym segments to obtain the combined segment "OP", while the search window is updated to include the prior window (e.g., "Operation, Order, was"). A search for the combined segment succeeds since "OP" is located within "Operation". The process continues in this fashion to identify "Order" as the expansion word for the segment "ORD". Thus, an initial backtrack level combines current and prior acronym segments and utilizes the prior search window, while a subsequent level combines the current and two prior acronym segments and utilizes the current search window modified to include the two previous expansion words.

Referring back to FIG. 7, if the backtrack search is successful as determined at step 126, expansion searcher module 22 updates parameters at step 128 and subsequently retrieves the next acronym search candidate character for processing at step 110 in accordance with the presence of additional characters as determined at step 130 as described above. When the backtrack search fails, the search terminates with respect to the current expansion list subset as described above (e.g., generally returning to step 88 of FIG. 6). The process continues until a search (with backtracking) fails as determined at step 126 or until each acronym search candidate character has been processed as determined at step 130 as described above.

With reference to FIG. 6, once expansion list subsets have been processed without identifying an expansion as determined at step 92, expansion searcher module 22 determines the presence of additional expansion candidates at step 102 as described above. If additional expansion candidates exist (e.g., the set of words following the acronym candidate), module 22 informs the expansion candidate identifier module at step 106 to commence processing of the next expansion candidate to search for an expansion as described above. Otherwise, no expansion has been identified for the current acronym candidate and module 22 informs the acronym identifier module at step 108 to locate and facilitate processing of the next potential acronym within the text as described above.

Once an expansion is identified as determined at step 88, the expansion (e.g., "VALID_EXPANSION_CANDIDATE" as indicated in FIG. 2) is verified at step 96 by expansion filter module 24 (FIG. 2). The verification applies a set of rules to the identified expansion to validate that expansion and to filter spurious expansions. This enhances the accuracy of expansions identified by the system. In particular, simulations indicated that approximately eighteen percent of expansions were spurious. The rules applied for the verification are derived based on properties of those spurious expansions. The values for particular rules are measured during the expansion search described above, while the rules and values are applied during verification. The rules, by way of example, examine various attributes of an expansion including: the presence of objectionable words within the expansion; the numbers within the expansion correspond to those within the acronym; presence of an objectionable word as the first expansion word; presence of an adverb as the last expansion word; presence of skipped stop and non-stop words within the expansion; presence of two words within the expansion containing an acronym segment in an intermediate portion; presence of the acronym within the expansion; and presence of delimiters within the expansion.

Figure 10:
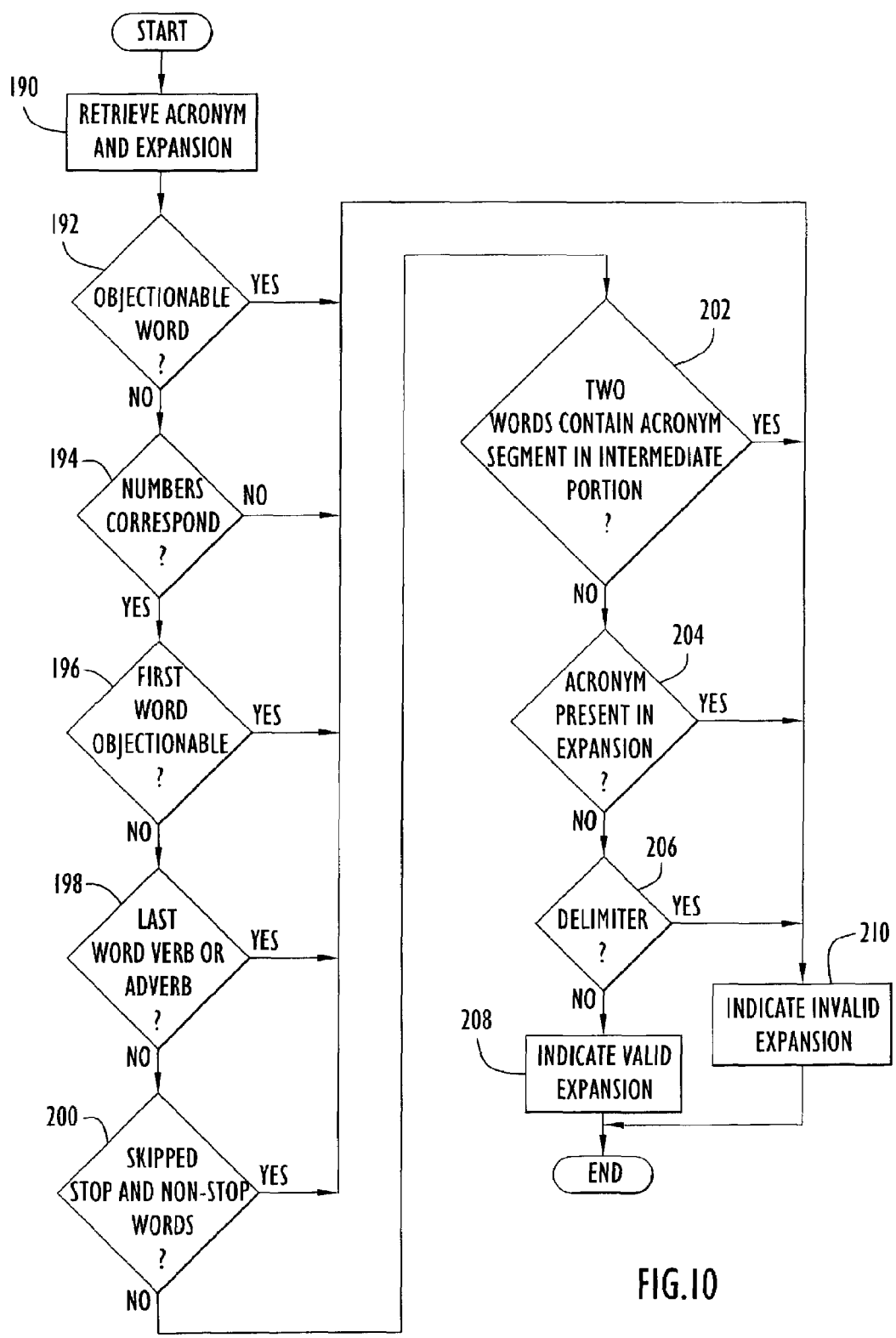
FIG. 10 is a procedural flow chart illustrating the manner in which the acronym expansion system verifies an identified acronym expansion according to the present invention.

This verification process is further illustrated in FIG. 10. Initially, expansion filter module 24 receives an acronym candidate (e.g., original form prior to preprocessing) and corresponding expansion at step 190. The expansion filter module examines the expansion at step 192 for the presence of an objectionable word (e.g., "his", "her", "with", etc.). This is typically accomplished by comparing expansion words to an objectionable word list (e.g., "OBJECTIONABLE_WORD_LIST" as indicated in FIG. 2). If an objectionable word is present, module 24 indicates an invalid expansion at step 210.

When objectionable words are absent from the expansion (e.g., thereby satisfying a condition for a valid expansion), the expansion filter module determines if numbers, preferably greater than four, within the acronym correspond with numbers within the expansion (e.g., "RM-98" with expansion "Rim Pac '98") at step 194. If numbers do not correspond, module 24 indicates an invalid expansion at step 210 as described above.

When the numbers correspond (e.g., thereby satisfying another condition for a valid expansion), the expansion filter module determines if the first word in the expansion is an objectionable first word (e.g., 'And', 'To', etc.) at step 196. This is typically accomplished by comparing the first word to a list of objectionable first words (e.g., "FIRST_WORD_OBJECTIONABLE_LIST" as indicated in FIG. 2). This list and the objectionable word list described above are preferably mutually exclusive. If the first word of the expansion is objectionable, module 24 indicates an invalid expansion at step 210 as described above.

When the first expansion word is not objectionable (e.g., thereby satisfying another condition of a valid expansion), the expansion filter module determines if the last expansion word is a verb or adverb at step 198. This is typically accomplished by examining the part-of-speech tag associated with that word. If the last expansion word is a verb or adverb, module 24 indicates an invalid expansion at step 210 as described above.

When the last expansion word is not a verb or adverb (e.g., thereby satisfying another condition of a valid expansion), the expansion filter module determines if a stop word and non-stop word each skipped during the expansion search described above are present next to each other within the expansion at step 200. If these words are each present in the expansion, module 24 indicates an invalid expansion at step 210 as described above.

When the expansion does not contain skipped stop and non-stop words (e.g., thereby satisfying another condition for a valid expansion), the expansion filter module determines at step 202 if the expansion includes two words each containing a respective acronym segment within an intermediate portion. In other words, module 24 determines the presence of two words identified based on the intermediate portion search (e.g., within the initial thirty percent of the word) described above. If these words are present in the expansion, module 24 indicates an invalid expansion at step 210 as described above.

When the expansion does not contain the intermediate portion search words (e.g., thereby satisfying another condition for a valid expansion), the expansion filter module determines the presence of the acronym within the expansion at step 204. If the acronym is present within the expansion, module 24 indicates an invalid expansion at step 210 as described above.

When the acronym is not present within the expansion (e.g., thereby satisfying another condition for a valid expansion), the expansion filter module determines the presence of delimiters (e.g., ":", "/", "(", "{", etc.) within the expansion at step 206. This is typically accomplished by comparing the expansion word characters to a delimiter list (e.g., "EXPANSION_DELIMITER_LIST" as indicated in FIG. 2), which may be user-configurable. If a delimiter is not present (e.g., thereby indicating satisfaction of each condition for a valid expansion), module 24 indicates a valid expansion at step 208. Otherwise, an invalid expansion is indicated at step 210 as described above.

Referring back to FIG. 6, if an expansion is valid as determined at step 98, the expansion filter module merges terms that were split (e.g., by hyphens, slashes, prefixes, etc.) prior to the search and during the expansion candidate processing described above. The acronym and resulting expansion are produced at step 104. When an expansion is invalid, the expansion searcher module determines the presence of additional expansion list subsets at step 92 as described above. If additional expansion list subsets are present, the next expansion list subset is retrieved for processing at step 84 as described above. When each expansion subset list has been processed, the expansion searcher module determines the presence of additional expansion candidates at step 102 as described above. If additional expansion candidates exist (e.g., the set of words following the acronym candidate), the expansion searcher module informs the expansion candidate identifier module at step 106 to commence processing of the next expansion candidate to search for an expansion as described above. The search process basically repeats until a valid expansion is found as determined at step 98 or until each expansion list subset within each expansion candidate is processed as determined at step 102 as described above. Once a valid expansion is produced at step 104, or each expansion candidate has been processed as determined at step 102, the expansion searcher module informs the acronym identifier module at step 108 to locate and facilitate processing of the next potential acronym within the text as described above.

The techniques and heuristics described above enhance system performance. For example, simulations indicated that the present invention incorrectly identifies expansions for three to five acronyms within every one hundred acronyms appearing in text. In contrast, the Acrophile system incorrectly identified expansions for thirty to fifty-five acronyms that occur in text.

The present invention may be utilized for various applications. For example, the present invention may be used to enhance digital library management, document management, regular full text search engines and technical information portals. As a stand-alone application, the present invention may assist document authors and publishers (e.g., military doctrine publishers, etc.) to compile a list of acronyms and corresponding expansions that is complete and accurate.

In the form of an embedded application, the present invention can improve indexing and search applications that operate on documents and web pages. For example, a search engine, such as Verity (available from Verity, Inc.), may utilize the present invention to expand a search request with an acronym (e.g., "HDP") to include the expansion (e.g., "High Density Polymer"), thereby encompassing documents within the search that do not explicitly include the expansion. Alternatively, the search engine may employ the expansion and uncover documents containing the acronym. These capabilities are especially desirable in technical, engineering, medical and scientific disciplines. Thus, the present invention offers technology that can serve a large market need for digital library management and search.

It will be appreciated that the embodiments described above and illustrated in the drawings represent only a few of the many ways of implementing an acronym extraction system and method of identifying acronyms and extracting corresponding expansions from text.

The computer system of the present invention may be implemented by any quantity of any personal or other type of computer or processing system (e.g., IBM-compatible, Apple, Macintosh, laptop, palm pilot, microprocessor, etc.). The computer system may include any commercially available operating system (e.g., Windows, OS/2, Unix, Linux, etc.), any commercially available and/or custom software (e.g., communications software, acronym tool software, etc.) and any types of input devices (e.g., keyboard, mouse, microphone, voice recognition, etc.). It is to be understood that the software of the acronym expansion system may be implemented in any desired computer language, and could be developed by one of ordinary skill in the computer and/or programming arts based on the functional description contained herein and the flow charts illustrated in the drawings. Further, any references herein of software performing various functions generally refer to computer systems or processors performing those functions under software control.

The computer system may alternatively be implemented by hardware or other processing circuitry. The various functions of the acronym expansion tool may be distributed in any manner among any quantity (e.g., one or more) of hardware and/or software modules or units, computer or processing systems or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flow charts and diagrams may be modified in any manner that accomplishes the functions described herein.

The acronym expansion tool may accommodate any quantity of any type of document containing text in any desired format (e.g., ASCII, plain text, any word processor or other application format, etc.). The acronym expansion tool may identify any types of shortened forms of words or phrases (e.g., acronyms, abbreviations, phrasal abbreviations, etc.) of any quantity, type or length in any type of text or document and extract the corresponding expansion, and accommodate documents or text of any language (e.g., languages of Indo-European origin including English, etc.) with suitable adaptations of the system language specific components and data resources (e.g., part-of-speech tagger, objectionable word list, stop word list, etc.). The acronym expansion tool may be implemented as a separate stand-alone program or software module or may be in the form of an embeddable system (e.g., within another system, as an embeddable software component within other software, etc.). The computer system may further function as a server in communication with client or user systems via any communications medium (e.g., network, WAN, LAN, Internet, Intranet, modem, etc.) to process client requests. The acronym tool software may be available on a recorded medium (e.g., magnetic or optical mediums, magneto-optic mediums, floppy diskettes, CD-ROM, memory devices, etc.) for use on stand-alone systems or systems connected by a network or other communications medium, and/or may be downloaded (e.g., in the form of carrier waves, packets, etc.) to systems via a network or other communications medium.

The acronym tool may utilize any conventional or other speech classifier or tagger for any desired language, and may classify any portion of text in any manner and at any point during processing (e.g., initially, during acronym identification, during expansion verification, when a classification is utilized, etc.). The speech information may be provided in any desired fashion (e.g., any symbols or character strings to indicate the part of speech, a data structure or record to store a word and classification, etc.). The various resource lists (e.g., stop-word, delimiter, prefix, objectionable word, etc.) and the lists containing processed data (e.g., expansion candidates, expansion lists and subsets, expansion candidate with split words, etc.) may be implemented by any quantity of lists of any desired data structure (e.g., file, array, linked-list, stack, queue, etc.) and may include any desired words or information. The resource lists may further be manipulable by a user or system administrator.

Identification of potential acronyms may be based on any desired criteria. The potential acronym may be identified based on compliance with all or any portion of the criteria. The thresholds for the criteria may be set to any desired values (e.g., any amount of capitalization or numeral proportion, any desired length, etc.) to identify words as potential acronyms. The delimiter list may be implemented by any quantity of lists and include any quantity of any types of delimiters or other characters or symbols. The exclusion list may be implemented by any quantity of lists and include any quantity of any types of words, symbols, acronyms or other information.

Any quantity of sets of any desired length may be retrieved from the text at any desired location (e.g., preceding and/or following the potential acronym, portions including the potential acronym, etc.) with respect to a potential acronym to serve as an expansion candidate. The positional information may include any type of information (e.g., pointer, array index, etc.) to identify the location of a word within the text. The acronym expansion tool may search any quantity or portion of the expansion candidates to identify an expansion. The tool may further search each of the candidates irrespective of prior identification of an expansion, and may remove any duplicate expansions.

The expansion candidate words may be spilt into any quantity of terms based on any desired conditions (e.g., delimiters, punctuation, prefixes, syllables, word length, etc.). The prefix list may be implemented by any quantity of lists and include any quantity of any portions of words, symbols or other characters. Similarly, the delimiter list may be implemented by any quantity of lists and include any quantity of any portions of words, symbols or other characters. The words may be split in any fashion with the terms including any desired portions of the split word. The words may be split based on any desired lists containing any desired information.

The acronym candidate and expansion candidate or list may be processed in any manner for searching (e.g., numeral expansion, plural or singular forms, subsets, removal of particular characters, symbols or delimiters, etc.). The numeral expansion may be performed for any types of numerals (e.g., Roman, etc.) within any range and for any characters or symbols. The acronym candidate may be modified in any fashion to convert from plural to singular form (e.g., remove any type of plural suffix and/or replace with a singular suffix, word replacement, utilize any desired lists for suffix and/or word replacement, etc.). The acronym and expansion candidates may alternatively be utilized for searching in their original or any prior form (e.g., without preprocessing, without word splitting, etc.).

The expansion candidates or lists may be utilized to derive any quantity of subsets based on any desired conditions (e.g., starting with or including within any portion any letter or symbols of the acronym candidate, etc.). The subsets may include any quantity of any words (e.g., preceding, following and/or including the identified word) within the expansion list. The acronym expansion tool may search any quantity or portion of the subsets to identify an expansion. The tool may further search each of the subsets irrespective of prior identification of an expansion, and may remove any duplicate expansions. The search window may be of any desired length (e.g., to include any portion of the subset or expansion candidate) and may be set by a user or system administrator. The search window may start at any desired location within an expansion subset or candidate and may be updated in any desired fashion (e.g., to start at any location for a subsequent search, adjust search window length or size, etc.).

The acronym expansion tool may accommodate any types of symbols or delimiters within an acronym candidate (e.g., delimiters, ampersands, etc.), and may identify any types of expansions for those symbols or delimiters (e.g., "AND" for the symbol "&", etc.). The acronym expansion tool may search any portions of search window words for an acronym segment or character (e.g., starting letter, any initial portion, any portion within the word, etc.) to identify an expansion word. The stop-word list may be implemented by any quantity of lists containing any quantity of words to be excluded from consideration as an expansion word. Any quantity of stop or non-stop words may be skipped during a search without indicating a failure to identify an expansion.

The acronym expansion tool may perform any quantity of levels of backtracking provided sufficient information is available. A backtrack may utilize any quantity or combinations of any portions of prior acronym segments and any quantity or combinations of any portions of prior search windows. The acronym segment portions may be combined or arranged in any fashion to conduct an expansion search, while the search windows may be combined or arranged in any fashion to similarly conduct an expansion search. The acronym segments, search windows and identified expansion words may be saved in any fashion via any suitable data structures (e.g., file, array, linked list, stack, queue, etc.).

The rules for verification may include any quantity of any type of rules, criteria or conditions to verify an identified expansion. The identified expansion may be verified based on compliance with all or any portion of the criteria. The thresholds for the criteria may be set to any desired values (e.g., any numbers correspond, any quantity of skipped stop and non-stop words, any quantity of words containing the acronym segment in an intermediate portion, last or other expansion word may be any type of grammatical classification, any portion of the acronym resides within the expansion, etc.) to validate any identified expansion. The delimiter list may be implemented by any quantity of lists and include any quantity of any types of delimiters or other characters or symbols. The objectionable word list and objectionable first word list may each be implemented by any quantity of lists and include any quantity of any types of words, symbols, acronyms or other information. These lists may be implemented by a common list or be mutually exclusive. The acronym expansion tool may alternatively produce an acronym and identified expansion without the verification.

The acronym expansion tool may interact with a user and receive input text in any desired fashion. For example, the tool may include a user interface (e.g., Graphical User Interface, etc.) to receive file information concerning a file containing the text. The user may enter information via the computer system input device (e.g., mouse, voice recognition, etc.), where the interface may display directories to enable a user to select a file. When the tool is embedded in another application or system, the tool may receive the text or a file (e.g., containing the text) directly or an indication of a file or other storage area where the text may be found for processing. The acronyms and corresponding expansions may be provided to the user, software or system in any desired form (e.g., display, hardcopy, stored in a file or other data structure in any desired format, etc.) and/or arranged in any manner or format.

The acronym expansion tool may process and transfer information between modules in any desired fashion. For example, the potential acronyms may be processed sequentially or any quantity or all of the potential acronyms may be processed at a given time. Similarly, one or any other quantity of expansion candidates or subsets may be processed at a given time. The tool may process documents upon receipt of text or at any time in a batch mode. In addition, the computer system may function as a server to process client requests for acronym extraction within supplied documents or text.

The present invention may be utilized for various applications. For example, the present invention may be used to enhance digital library management, document management, regular full text search engines, technical information portals and voice responsive and/or voice and/or speech synthesis systems. As a stand-alone application, the present invention may assist document authors and publishers (e.g., military doctrine publishers, etc.) to compile a list of acronyms and corresponding expansions that is complete and accurate. In the form of an embedded application, the present invention can improve indexing and search applications that operate on documents and web pages.

From the foregoing description, it will be appreciated that the invention makes available a novel acronym extraction system and method for identifying acronyms and extracting corresponding extractions from text, wherein acronyms are identified within text and corresponding expansions are extracted with enhanced accuracy.

Having described preferred embodiments of a new and improved acronym extraction system and method for identifying acronyms and extracting corresponding extractions from text, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for identifying abbreviated terms within text each representing a corresponding phrase of at least one term and extracting expansions of said abbreviated terms from said text in the form of said corresponding phrases comprising:
   a processing system to receive said text and identify abbreviated terms and corresponding expansions therein, said processing system including:
      an identification module to examine said text to identify at least one abbreviated term residing therein;
      an expansion retrieval module to retrieve at least one portion of said text for an identified abbreviated term, wherein each retrieved text portion is located within said text proximate said identified abbreviated term; and
      an expansion extraction module to compare said identified abbreviated term with at least one corresponding retrieved text portion to extract an expansion therefrom for said abbreviated term and to verify said extracted expansion to produce a valid expansion for said identified abbreviated term, wherein said expansion extraction module includes:
         an expansion initialization module to examine a retrieved text portion for said identified abbreviated term and selectively produce at least one subset of said retrieved text portion for identifying and extracting said expansion, wherein said at least one subset is produced based on a comparison of an initial portion of said identified abbreviated term with initial portions of terms within said retrieved text portion; and
         a search module to iteratively scan a retrieved text portion subset and compare successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein a current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

2. The system of claim 1, wherein said at least one abbreviated term includes an acronym.

3. The system of claim 1 further including:
   a classification module to determine a grammatical classification of each term within said text to enable identification of an abbreviated term and a corresponding valid expansion.

4. The system of claim 3, wherein said identification module includes:
   a text attribute module to examine a term within said text and determine compliance of text term attributes with particular conditions in order to identify that text term as an abbreviated term.

5. The system of claim 4, wherein said conditions relate to at least one of:
   said grammatical classification of a text term;
   a length of a text term being within a particular range;
   the presence of a predetermined delimiter within a text term;
   an amount of capitalization within a text term;
   an amount of numerals within a text term; and
   a text term being a predetermined term excluded from consideration as an abbreviated term.

6. The system of claim 1, wherein said expansion retrieval module includes:
   a portion size module to determine a number of terms to retrieve for each text portion based on a length of said identified abbreviated term.

7. The system of claim 1, wherein said expansion retrieval module retrieves a plurality of portions from said text for said identified abbreviated term, wherein said plurality of text portions for said identified abbreviated term includes a first portion located within said text preceding said identified abbreviated term and a second portion located within said text following said identified abbreviated term.

8. The system of claim 1 further including:
   a decomposition module to selectively decompose terms within at least one retrieved text portion for said identified abbreviated term into individual sub-terms to facilitate identification of an expansion within that retrieved text portion.

9. The system of claim 8, wherein said decomposition module includes:
   a term decomposition module to examine each term within said at least one retrieved text portion and decompose that term into said individual sub-terms in response to determining the presence within that term of at least one of: a predetermined prefix and a predetermined delimiter.

10. The system of claim 1, wherein said expansion extraction module includes:
   a term initialization module to expand an identified abbreviated term containing a numeral within a predetermined range by replacing a combination of said numeral and an immediately preceding character within that abbreviated term with a string including said preceding character repeated a number of instances corresponding to said numeral.

11. The system of claim 10, wherein said term initialization module includes:
a term conversion module to convert an identified abbreviated term in plural form to singular form.

12. The system of claim 1, wherein said expansion initialization module includes:
a subset module to identify terms within each examined text portion that include an initial portion containing a first character of said identified abbreviated term and to produce a corresponding subset for each identified term including said identified term and following terms within a corresponding examined text portion.

13. The system of claim 1, wherein said search module includes:
a subset search module to compare portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

14. The system of claim 13, wherein said subset search module includes:
an expansion term module to compare an abbreviated term portion to said terms within said search window and identify said corresponding expansion term for that abbreviated term portion in response to a search window term including that abbreviated term portion as a starting portion or within an initial portion of that search window term.

15. The system of claim 14, wherein said initial portion includes the initial thirty percent of said search window term.

16. The system of claim 13, wherein said subset search module includes:
a backtrack module to identify a corresponding expansion term for a current abbreviated term portion utilizing at least one previous abbreviated term portion and at least one term from a previous search window in response to a failure to identify an expansion term for said current abbreviated term portion.

17. The system of claim 16, wherein said backtrack module includes:
a first level module to compare a combination of the current and previous portions of said identified abbreviated term to terms within a previous search window to identify an expansion term for said current abbreviated term portion.

18. The system of claim 17, wherein said backtrack module further includes:
a second level module to compare a combination of the current and a plurality of previous portions of said identified abbreviated term to a combination of terms including terms within a current search window and a plurality of previous identified expansion terms to identify an expansion term for said current abbreviated term portion in response to a failure by said first level module to identify that expansion term.

19. The system of claim 1, wherein said expansion extraction module includes:
a verification module to verify said extracted expansion against a set of verification rules that indicate a valid expansion in response to attributes of said extracted expansion satisfying particular conditions.

20. The system of claim 19, wherein said conditions relate to at least one of:
said extracted expansion including said identified abbreviated term, a predetermined delimiter or a predetermined expansion invalidating term;
numerals within said identified abbreviated term corresponding to numerals within said extracted expansion;
a first term of said extracted expansion including a predetermined expansion invalidating term;
a grammatical classification of a last term of said extracted expansion;
the presence of particular terms within said extracted expansion being skipped during identification of said extracted expansion; and
the presence of at least two terms within said extracted expansion containing an abbreviated term portion within an intermediate portion of those terms.

21. A method of identifying abbreviated terms within text each representing a corresponding phrase of at least one term and extracting expansions of said abbreviated terms from said text in the form of said corresponding phrases comprising:
(a) examining said text to identify at least one abbreviated term residing therein;
(b) retrieving at least one portion of said text for an identified abbreviated term, wherein each retrieved text portion is located within said text proximate said identified abbreviated term; and
(c) comparing said identified abbreviated term with at least one corresponding retrieved text portion to extract an expansion therefrom for said abbreviated term and verifying said extracted expansion to produce a valid expansion for said identified abbreviated term, wherein step (c) further includes:
(c.1) examining a retrieved text portion for said identified abbreviated term and selectively producing at least one subset of said retrieved text portion for identifying and extracting said expansion, wherein said at least one subset is produced based on a comparison of an initial portion of said identified abbreviated term with initial portions of terms within said retrieved text portion; and
(c.2) iteratively scanning a retrieved text portion subset and comparing successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein a current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

22. The method of claim 21, wherein said at least one abbreviated term includes an acronym.

23. The method of claim 21, wherein step (a) further includes:
(a.1) determining a grammatical classification of each term within said text to enable identification of an abbreviated term and a corresponding valid expansion.

24. The method of claim 23, wherein step (a.1) further includes:

(a.1.1) examining a term within said text and determining compliance of text term attributes with particular conditions in order to identify that text term as an abbreviated term.

25. The method of claim 24, wherein said conditions relate to at least one of:
   said grammatical classification of a text term;
   a length of a text term being within a particular range;
   the presence of a predetermined delimiter within a text term;
   an amount of capitalization within a text term;
   an amount of numerals within a text term; and
   a text term being a predetermined term excluded from consideration as an abbreviated term.

26. The method of claim 21, wherein step (b) further includes:
   (b.1) determining a number of terms to retrieve for each text portion based on a length of said identified abbreviated term.

27. The method of claim 21, wherein step (b) further includes:
   (b.1) retrieving a plurality of portions from said text for said identified abbreviated term, wherein said plurality of text portions for said identified abbreviated term includes a first portion located within said text preceding said identified abbreviated term and a second portion located within said text following said identified abbreviated term.

28. The method of claim 21, wherein step (b) further includes:
   (b.1) selectively decomposing terms within at least one retrieved text portion for said identified abbreviated term into individual sub-terms to facilitate identification of an expansion within that retrieved text portion.

29. The method of claim 28, wherein step (b.1) further includes:
   (b.1.1) examining each term within said at least one retrieved text portion and decomposing that term into said individual sub-terms in response to determining the presence within that term of at least one of: a predetermined prefix and a predetermined delimiter.

30. The method of claim 21, wherein step (c.1) further includes:
   (c.1.1) expanding an identified abbreviated term containing a numeral within a predetermined range by replacing a combination of said numeral and an immediately preceding character within that abbreviated term with a string including said preceding character repeated a number of instances corresponding to said numeral.

31. The method of claim 30, wherein step (c.1) further includes:
   (c.1.2) converting an identified abbreviated term in plural form to singular form.

32. The method of claim 21, wherein step (c.1) further includes:
   (c.1.1) identifying terms within each examined text portion that include an initial portion containing a first character of said identified abbreviated term and producing a corresponding subset for each identified term including said identified term and following terms within a corresponding examined text portion.

33. The method of claim 21, wherein step (c.2) further includes:
   (c.2.1) comparing portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

34. The method of claim 33, wherein step (c.2.1) further includes:
   (c.2.1.1) comparing an abbreviated term portion to said terms within said search window and identifying said corresponding expansion term for that abbreviated term portion in response to a search window term including that abbreviated term portion as a starting portion or within an initial portion of that search window term.

35. The method of claim 34, wherein said initial portion includes the initial thirty percent of said search window term.

36. The method of claim 33, wherein step (c.2.1) further includes:
   (c.2.1.1) identifying a corresponding expansion term for a current abbreviated term portion utilizing at least one previous abbreviated term portion and at least one term from a previous search window in response to a failure to identify an expansion term for said current abbreviated term portion.

37. The method of claim 36, wherein step (c.2.1.1) further includes:
   (c.2.1.1.1) comparing a combination of the current and previous portions of said identified abbreviated term to terms within a previous search window to identify an expansion term for said current abbreviated term portion.

38. The method of claim 37, wherein step (c.2.1.1.1) further includes:
   (c.2.1.1.2) comparing a combination of the current and a plurality of previous portions of said identified abbreviated term to a combination of terms including terms within a current search window and a plurality of previous identified expansion terms to identify an expansion term for said current abbreviated term portion in response to a failure to identify that expansion term within step (c.2.1.1.1).

39. The method of claim 21, wherein step (c) further includes:
   (c.3) verifying said extracted expansion against a set of verification rules that indicate a valid expansion in response to attributes of said extracted expansion satisfying particular conditions.

40. The method of claim 39, wherein said conditions relate to at least one of:
   said extracted expansion including said identified abbreviated term, a predetermined delimiter or a predetermined expansion invalidating term;
   numerals within said identified abbreviated term corresponding to numerals within said extracted expansion;
   a first term of said extracted expansion including a predetermined expansion invalidating term;
   a grammatical classification of a last term of said extracted expansion;
   the presence of particular terms within said extracted expansion being skipped during identification of said extracted expansion; and
   the presence of at least two terms within said extracted expansion containing an abbreviated term portion within an intermediate portion of those terms.

41. A program product apparatus including a computer readable medium with computer program logic recorded thereon for identifying abbreviated terms within text each representing a corresponding phrase of at least one term and extracting expansions of said abbreviated terms from said text in the form of said corresponding phrases, said program product apparatus comprising:

an identification module to examine said text to identify at least one abbreviated term residing therein;

an expansion retrieval module to retrieve at least one portion of said text for an identified abbreviated term, wherein each retrieved text portion is located within said text proximate said identified abbreviated term; and an expansion extraction module to compare said identified abbreviated term with at least one corresponding retrieved text portion to extract an expansion therefrom for said abbreviated term and to verify said extracted expansion to produce a valid expansion for said identified abbreviated term, wherein said expansion extraction module includes:

an expansion initialization module to examine a retrieved text portion for said identified abbreviated term and selectively produce at least one subset of said retrieved text portion for identifying and extracting said expansion, wherein said at least one subset is produced based on a comparison of an initial portion of said identified abbreviated term with initial portions of terms within said retrieved text portion; and a search module to iteratively scan a retrieved text portion subset and compare successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein a current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

42. The apparatus of claim 41, wherein said at least one abbreviated term includes an acronym.

43. The apparatus of claim 41 further including:
a classification module to determine a grammatical classification of each term within said text to enable identification of an abbreviated term and a corresponding valid expansion.

44. The apparatus of claim 41, wherein said expansion retrieval module includes:
a portion size module to determine a number of terms to retrieve for each text portion based on a length of said identified abbreviated term.

45. The apparatus of claim 41, wherein said expansion retrieval module retrieves a plurality of portions from said text for said identified abbreviated term, wherein said plurality of text portions for said identified abbreviated term includes a first portion located within said text preceding said identified abbreviated term and a second portion located within said text following said identified abbreviated term.

46. The apparatus of claim 41 further including:
a decomposition module to selectively decompose terms within at least one retrieved text portion for said identified abbreviated term into individual sub-terms to facilitate identification of an expansion within that retrieved text portion.

47. The apparatus of claim 41, wherein said expansion initialization module includes:
a subset module to identify terms within each examined text portion that include an initial portion containing a first character of said identified abbreviated term and to produce a corresponding subset for each identified term including said identified term and following terms within a corresponding examined text portion.

48. The apparatus of claim 41, wherein said search module includes:
a subset search module to compare portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

49. The apparatus of claim 48, wherein said subset search module includes:
an expansion term module to compare an abbreviated term portion to said terms within said search window and identify said corresponding expansion term for that abbreviated term portion in response to a search window term including that abbreviated term portion as a starting portion or within an initial portion of that search window term.

50. The apparatus of claim 48, wherein said subset search module includes:
a backtrack module to identify a corresponding expansion term for a current abbreviated term portion utilizing at least one previous abbreviated term portion and at least one term from a previous search window in response to a failure to identify an expansion term for said current abbreviated term portion.

51. The apparatus of claim 50, wherein said backtrack module includes:
a first level module to compare a combination of the current and previous portions of said identified abbreviated term to terms within a previous search window to identify an expansion term for said current abbreviated term portion.

52. The apparatus of claim 51, wherein said backtrack module further includes:
a second level module to compare a combination of the current and a plurality of previous portions of said identified abbreviated term to a combination of terms including terms within a current search window and a plurality of previous identified expansion terms to identify an expansion term for said current abbreviated term portion in response to a failure by said first level module to identify that expansion term.

53. The apparatus of claim 41, wherein said expansion extraction module includes:
a verification module to verify said extracted expansion against a set of verification rules that indicate a valid expansion in response to attributes of said extracted expansion satisfying particular conditions.

54. A system for identifying abbreviated terms within text each representing a corresponding phrase of at least one term and extracting expansions of said abbreviated terms from said text in the form of said corresponding phrases comprising:

a processing system to receive said text and identify abbreviated terms and corresponding expansions therein, said processing system including:
an identification module to examine said text to identify at least one abbreviated term residing therein;
an expansion retrieval module to retrieve a plurality of portions of said text for an identified abbreviated term, wherein said plurality of text portions for said identified abbreviated term includes a first portion located within said text preceding said identified abbreviated term and a second portion located within said text following said identified abbreviated term;
an expansion extraction module to compare said identified abbreviated term with at least one corresponding retrieved text portion to extract an expansion therefrom for said abbreviated term, wherein said expansion extraction module includes:
an expansion initialization module to examine a retrieved text portion for said identified abbreviated term and selectively produce at least one subset of said retrieved text portion for identifying and extracting said expansion, wherein said at least one subset is produced based on a comparison of an initial portion of said identified abbreviated term with initial portions of terms within said retrieved text portion; and
a search module to iteratively scan a retrieved text portion subset and compare successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein a current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

55. The system of claim 54, wherein said at least one abbreviated term includes an acronym.

56. The system of claim 54, wherein said search module includes:
a subset search module to compare portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

57. The system of claim 56, wherein said subset search module includes:
a backtrack module to identify a corresponding expansion term for a current abbreviated term portion utilizing at least one previous abbreviated term portion and at least one term from a previous search window in response to a failure to identify an expansion term for said current abbreviated term portion.

58. The system of claim 54, wherein said expansion extraction module includes:

a verification module to verify said extracted expansion against a set of verification rules that indicate a valid expansion in response to attributes of said extracted expansion satisfying particular conditions.

59. A method of identifying abbreviated terms within text each representing a corresponding phrase of at least one term and extracting expansions of said abbreviated terms from said text in the form of said corresponding phrases comprising:
(a) examining said text to identify at least one abbreviated term residing therein;
(b) retrieving a plurality of portions of said text for an identified abbreviated term, wherein said plurality of text portions for said identified abbreviated term includes a first portion located within said text preceding said identified abbreviated term and a second portion located within said text following said identified abbreviated term; and
(c) comparing said identified abbreviated term with at least one corresponding retrieved text portion to extract an expansion therefrom for said abbreviated term, wherein step (c) further includes:
(c.1) examining a retrieved text portion for said identified abbreviated term and selectively producing at least one subset of said retrieved text portion for identifying and extracting said expansion, wherein said at least one subset is produced based on a comparison of an initial portion of said identified abbreviated term with initial portions of terms within said retrieved text portion; and
(c.2) iteratively scanning a retrieved text portion subset and comparing successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein a current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

60. The method of claim 59, wherein said at least one abbreviated term includes an acronym.

61. The method of claim 50, wherein step (c.2) further includes:
(c.2.1) comparing portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

62. The method of claim 61, wherein step (c.2.1) further includes:
(c.2.1.1) identifying a corresponding expansion term for a current abbreviated term portion utilizing at least one previous abbreviated term portion and at least one term from a previous search window in response to a failure to identify an expansion term for said current abbreviated term portion.

63. The method of claim 59, wherein step (c) further includes:
- (c.3) verifying said extracted expansion against a set of verification rules that indicate a valid expansion in response to attributes of said extracted expansion satisfying particular conditions.

64. A program product apparatus including a computer readable medium with computer program logic recorded thereon for identifying abbreviated terms within text each representing a corresponding phrase of at least one term and extracting expansions of said abbreviated terms from said text in the form of said corresponding phrases, said program product apparatus comprising:
- an identification module to examine said text to identify at least one abbreviated term residing therein;
- an expansion retrieval module to retrieve a plurality of portions of said text for an identified abbreviated term, wherein said plurality of text portions for said identified abbreviated term includes a first portion located within said text preceding said identified abbreviated term and a second portion located within said text following said identified abbreviated term;
- an expansion extraction module to compare said identified abbreviated term with at least one corresponding retrieved text portion to extract an expansion therefrom for said abbreviated term, wherein said expansion extraction module includes:
  - an expansion initialization module to examine a retrieved text portion for said identified abbreviated term and selectively produce at least one subset of said retrieved text portion for identifying and extracting said expansion, wherein said at least one subset is produced based on a comparison of an initial portion of said identified abbreviated term with initial portions of terms within said retrieved text portion; and
  - a search module to iteratively scan a retrieved text portion subset and compare successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein a current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

65. The apparatus of claim 64, wherein said at least one abbreviated term includes an acronym.

66. The apparatus of claim 64, wherein said search module includes:
- a subset search module to compare portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

67. The apparatus of claim 66, wherein said subset search module includes:
- a backtrack module to identify a corresponding expansion term for a current abbreviated term portion utilizing at least one previous abbreviated term portion and at least one term from a previous search window in response to a failure to identify an expansion term for said current abbreviated term portion.

68. The apparatus of claim 64, wherein said expansion extraction module includes:
- a verification module to verify said extracted expansion against a set of verification rules that indicate a valid expansion in response to attributes of said extracted expansion satisfying particular conditions.

69. A system for identifying abbreviated terms within text each representing a corresponding phrase of at least one term and extracting expansions of said abbreviated terms from said text in the form of said corresponding phrases comprising:
- a processing system to receive said text and identify abbreviated terms and corresponding expansions therein, said processing system including:
  - an identification module to examine said text to identify at least one abbreviated term residing therein;
  - an expansion retrieval module to retrieve at least one portion of said text for an identified abbreviated term, wherein each retrieved text portion is located within said text proximate said identified abbreviated term; and
  - an expansion extraction module to compare portions of said identified abbreviated term with at least one corresponding retrieved text portion to extract an expansion therefrom for said abbreviated term, wherein said expansion extraction module includes:
    - an expansion initialization module to examine a retrieved text portion for said identified abbreviated term and selectively produce at least one subset of said retrieved text portion for identifying and extracting said expansion, wherein said at least one subset is produced based on a comparison of an initial portion of said identified abbreviated term with initial portions of terms within said retrieved text portion; and
    - a search module to iteratively scan a retrieved text portion subset and compare successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein said search module includes:
      - a backtrack module to identify a corresponding expansion term for a current abbreviated term portion utilizing information from at least one previous abbreviated term portion comparison, wherein said current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

70. The system of claim 69, wherein said at least one abbreviated term includes an acronym.

71. The system of claim 69, wherein said search module further includes:
- a subset search module to compare said portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

72. The system of claim 71, wherein said backtrack module includes:
- a first level module to compare a combination of the current and previous portions of said identified abbreviated term to terms within a previous search window to identify an expansion term for said current abbreviated term portion.

73. The system of claim 72, wherein said backtrack module further includes:
- a second level module to compare a combination of the current and a plurality of previous portions of said identified abbreviated term to a combination of terms including terms within a current search window and a plurality of previous identified expansion terms to identify an expansion term for said current abbreviated term portion in response to a failure by said first level module to identify that expansion term.

74. The system of claim 69, wherein said expansion extraction module includes:
- a verification module to verify said extracted expansion against a set of verification rules that indicate a valid expansion in response to attributes of said extracted expansion satisfying particular conditions.

75. A method of identifying abbreviated terms within text each representing a corresponding phrase of at least one term and extracting expansions of said abbreviated terms from said text in the form of said corresponding phrases comprising:
- (a) examining said text to identify at least one abbreviated term residing therein;
- (b) retrieving at least one portion of said text for an identified abbreviated term, wherein each retrieved text portion is located within said text proximate said identified abbreviated term; and
- (c) comparing portions of said identified abbreviated term with at least one corresponding retrieved text portion to extract an expansion therefrom, wherein step (c) further includes:
  - (c.1) examining a retrieved text portion for said identified abbreviated term and selectively producing at least one subset of said retrieved text portion for identifying and extracting said expansion, wherein said at least one subset is produced based on a comparison of an initial portion of said identified abbreviated term with initial portions of terms within said retrieved text portion; and
  - (c.2) iteratively scanning a retrieved text portion subset and comparing successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and in response to a failure of said current abbreviated term portion and corresponding search window to identify a corresponding expansion term, identifying a corresponding expansion term for said current abbreviated term portion utilizing information from at least one previous abbreviated term portion comparison, wherein said current abbreviated term portion and corresponding search window are respectively combined for a subsequent scan iteration with at least one prior abbreviated term portion and corresponding search window that identify a corresponding expansion term.

76. The method of claim 75, wherein said at least one abbreviated term includes an acronym.

77. The method of claim 75, wherein step (c.2) further includes:
- (c.2.1) comparing said portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

78. The method of claim 77, wherein step (c.2.1) further includes:
- (c.2.1.1) in response to said failure to identify said expansion term for said current abbreviated term portion, comparing a combination of the current and previous portions of said identified abbreviated term to terms within a previous search window to identify an expansion term for said current abbreviated term portion.

79. The method of claim 78, wherein step (c.2.1) further includes:
- (c.2.1.2) in response to a failure to identify an expansion term in step (c.2.1.1), comparing a combination of the current and a plurality of previous portions of said identified abbreviated term to a combination of terms including terms within a current search window and a plurality of previous identified expansion terms to identify an expansion term for said current abbreviated term portion.

80. The method of claim 75, wherein step (c) further includes:
- (c.3) verifying said extracted expansion against a set of verification rules that indicate a valid expansion in response to attributes of said extracted expansion satisfying particular conditions.

81. A program product apparatus including a computer readable medium with computer program logic recorded thereon for identifying abbreviated terms within text each representing a corresponding phrase of at least one term and extracting expansions of said abbreviated terms from said text in the form of said corresponding phrases, said program product apparatus comprising:
- an identification module to examine said text to identify at least one abbreviated term residing therein;
- an expansion retrieval module to retrieve at least one portion of said text for an identified abbreviated term, wherein each retrieved text portion is located within said text proximate said identified abbreviated term; and
- an expansion extraction module to compare portions of said identified abbreviated term with at least one corresponding retrieved text portion to extract an expansion therefrom for said abbreviated term, wherein said expansion extraction module includes:

an expansion initialization module to examine a retrieved text portion for said identified abbreviated term and selectively produce at least one subset of said retrieved text portion for identifying and extracting said expansion, wherein said at least one subset is produced based on a comparison of an initial portion of said identified abbreviated term with initial portions of terms within said retrieved text portion; and a search module to iteratively scan a retrieved text portion subset and compare successive portions of said identified abbreviated term to at least one term within a corresponding search window for said abbreviated term portion to identify corresponding expansion terms within that subset for said abbreviated term portions, wherein said search window includes a predetermined number of terms from said retrieved text portion subset and is movable within that subset, and wherein said search module includes:

a backtrack module to identify a corresponding expansion term for a current abbreviated term portion utilizing information from at least one previous abbreviated term portion comparison, wherein said current abbreviated term portion and corresponding search window are respectively combined for a subsequent scan iteration with at least one prior abbreviated term portion and corresponding search window that identify a corresponding expansion term in response to failure of said current abbreviated term portion and corresponding search window to identify a corresponding expansion term.

82. The apparatus of claim 81, wherein said at least one abbreviated term includes an acronym.

83. The apparatus of claim 81, wherein said search module further includes:

a subset search module to compare said portions of said identified abbreviated term to terms within said corresponding search windows to identify a corresponding expansion term for each abbreviated term portion, wherein said search window is modified in response to identification of an expansion term to include terms within said retrieved text portion subset following said identified expansion term.

84. The apparatus of claim 83, wherein said backtrack module includes:

a first level module to compare a combination of the current and previous portions of said identified abbreviated term to terms within a previous search window to identify an expansion term for said current abbreviated term portion.

85. The apparatus of claim 84, wherein said backtrack module further includes:

a second level module to compare a combination of the current and a plurality of previous portions of said identified abbreviated term to a combination of terms including terms within a current search window and a plurality of previous identified expansion terms to identify an expansion term for said current abbreviated term portion in response to a failure by said first level module to identify that expansion term.

86. The apparatus of claim 81, wherein said expansion extraction module includes:

a verification module to verify said extracted expansion against a set of verification rules that indicate a valid expansion in response to attributes of said extracted expansion satisfying particular conditions.

* * * * *